United States Patent
Duvvuri

(10) Patent No.: US 12,530,482 B2
(45) Date of Patent: Jan. 20, 2026

(54) SYSTEMS AND METHODS FOR ACCESS PROVISIONING USING A DATA PROTECTION ARCHITECTURE

(71) Applicant: State Farm Mutual Automobile Insurance Company, Bloomington, IL (US)

(72) Inventor: Suchi Duvvuri, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 31 days.

(21) Appl. No.: 18/745,796

(22) Filed: Jun. 17, 2024

(65) Prior Publication Data

US 2025/0384153 A1 Dec. 18, 2025

(51) Int. Cl.
*G06F 21/62* (2013.01)

(52) U.S. Cl.
CPC ................ *G06F 21/6218* (2013.01)

(58) Field of Classification Search
CPC ................................................ G06F 21/6218
See application file for complete search history.

(56) References Cited

U.S. PATENT DOCUMENTS

| | | | | |
|---|---|---|---|---|
| 10,771,468 B1* | 9/2020 | Walker | ............... | H04L 63/0281 |
| 10,810,055 B1* | 10/2020 | Walker | ............... | G06F 16/2358 |
| 12,294,650 B2* | 5/2025 | Coffing | ............... | H04L 63/101 |
| 12,299,162 B1* | 5/2025 | Butler | ............... | H04L 9/3213 |
| 2023/0342179 A1* | 10/2023 | Suttle | ............... | H04L 41/0894 |
| 2025/0175473 A1* | 5/2025 | Shaw | ............... | H04L 63/145 |

OTHER PUBLICATIONS

Kanumarlapudi et al., Automating access controls in AWS Lake Formation, Retrieved from https://github.com/aws-samples/aws-lakeformation-access-controls-automation on Mar. 1, 2024, Copyright 2024, 6 pgs.

* cited by examiner

*Primary Examiner* — Han Yang
(74) *Attorney, Agent, or Firm* — Foley & Lardner LLP

(57) ABSTRACT

Various examples, systems and methods are disclosed relating to access provisioning in a data lake environment. One system is a data protection system including one or more memory devices having instructions stored thereon that, when executed by one or more processors, cause the one or more processors to perform operations including receiving a request for access by a requestor comprising a payload. The operations further include initiating an endpoint command by invoking a first endpoint of a plurality of endpoints based on a first type of access requested in the request. The operations further include executing or performing an entry function of the endpoint. The operations further include executing or performing an access function. The operations further include updating the status of the request.

20 Claims, 8 Drawing Sheets

FIG. 7A

SYSTEMS AND METHODS FOR ACCESS PROVISIONING USING A DATA PROTECTION ARCHITECTURE

FIELD OF THE INVENTION

The present disclosure relates to a data protection system. Various example embodiments relate more particularly to systems and methods for using various request and access functions to provision access to data resources.

BACKGROUND

Users often request access to databases and data resources. For example, within a data lake environment, handling these requests often involves a manual, multistep process that includes input from various database managers or data resource administrators. Users may desire a tool that can provision data access and maintain data security.

BRIEF SUMMARY

One implementation of the present disclosure relates to a method for access provisioning in a data lake environment. The method can include receiving, by one or more processing circuits via an application programming interface (API) gateway, a request for access by a requestor including a payload. The method can include initiating, by the one or more processing circuits, an endpoint command by invoking a first endpoint of a plurality of endpoints based on a first type of access requested in the request. The method can include generating, by the one or more processing circuits using an entry function of the first endpoint, a status of the request. The method can include logging, by the one or more processing circuits using the entry function of the first endpoint, the status of the request in a database system. The method can include verifying, by the one or more processing circuits using the entry function of the first endpoint, the payload and that the requestor satisfies at least one of a security parameter or a compliance parameter of a first data resource of the data lake environment. The method can include updating, by the one or more processing circuits using an access function of the first endpoint, at least one of an access setting or a permission to the first data resource according to the request, wherein updating includes using the access function to modify an access level and apply a corresponding security policy to a user account of the requestor or the first data resource. The method can include updating, by the one or more processing circuits, the status of the request in the database system.

In some implementations, the entry function and the access function are executed based on activating, by the one or more processing circuits, the entry function and the access function on the first endpoint. In some implementations, activating the entry function and the access function includes interfacing with the first data resource to apply the payload in enforcing the at least one security parameter or compliance parameter and processing the request for access.

In some implementations, the entry function includes defining a criteria determining an eligibility of the request for processing, the method further including executing, by the one or more processing circuits, the entry function by recording the request including the payload and a corresponding request identifier in the database system, logging the status as initiated, verifying the payload, transmitting a confirmation response to a requestor computing system indicating acceptance of the request, and invoking the access function. In some implementations, the access function includes defining an access restriction or an authentication restriction of the first data resource, the method further including executing, by the one or more processing circuits, the access function by in response to the invocation by the entry function, modifying the access level by adjusting the at least one access setting or permission based on one or more database parameters for a plurality of user roles or resource types, applying the corresponding security policy to the user account or the first data resource by adjusting or enforcing the access restriction or the authentication restriction based on the first type of access requested, generating a log report including information of the adjustment to the at least one of access setting or permission, an identity of the requestor, and a timestamp of the execution of the access function, and storing the log report in the database system.

In some implementations, the adjustment of the at least one access setting or permission to the first data resource includes granting access or revoking access, and wherein satisfying the security parameter corresponds to a validation of a credential in the payload based on a plurality user authentication levels, and wherein satisfying the compliance parameter corresponds to a validation of the first type of access requested in the payload based on a plurality of access rules of the first data resource. In some implementations, the plurality of endpoints include a name-based endpoint, a data filter endpoint, a drop table endpoint, and a tag based endpoint, and wherein the initiating to the first endpoint is further based on access parameters in a plurality of payload fields of the payload.

In some implementations, the one or more processing circuits is a distributed computing system including at least a first computing system executing at least one of the one or more processing circuits and a second computing system executing at least one of the one or more processing circuits, and wherein the method further including in response to receiving the request, routing, by the one or more processing circuits, the request and the payload to the first computing system or the second computing system based on a real-time status of either the first computing system or the second computing system. In some implementations, the access setting corresponds to a configuration parameter defining access controls to the first data resource, and wherein the permission corresponds to an access grant defining operations executable on the first data resource granted to the requestor.

In some implementations, prior to verifying the payload, the method further including identifying, by the one or more processing circuits, the at least one security parameter or compliance parameter is unsatisfied, transmitting, by the one or more processing circuits, a failure message to a requestor computing system including the at least one security parameter or compliance parameter being unsatisfied, receiving, by the one or more processing circuits, a payload updated to satisfy the at least one security parameter or compliance parameter. In some implementations, the method further including, in response to updating the status of the request, transmitting, by the one or more processing circuits, a response to the request for access to a requestor computing system including an indication of a successful processing of the request. In some implementations, the entry function and the access function are serverless functions corresponding to an execution of a set of actions within a first workflow of the access provisioning, wherein each of the serverless functions are structured to execute a subset of actions of the set of actions within the first workflow of the access provisioning.

One implementation of the present disclosure relates to a data protection system for access provisioning in a data lake environment. The data protection system can include one or more memory devices having instructions stored thereon that, when executed by one or more processors, cause the one or more processors to perform operations including receiving, via an application programming interface (API) gateway, a request for access by a requestor including a payload. The operations can further include initiating an endpoint command by invoking a first endpoint of a plurality of endpoints based on a first type of access requested in the request. The operations can further include generating, using an entry function of the first endpoint, a status of the request. The operations can further include logging, using the entry function of the first endpoint, the status of the request in a database system. The operations can further include verifying, using the entry function of the first endpoint, the payload and that the requestor satisfies at least one of a security parameter or a compliance parameter of a first data resource of the data lake environment. The operations can further include updating, using an access function of the first endpoint, at least one of an access setting or a permission to the first data resource according to the request, wherein updating includes using the access function to modify an access level and apply a corresponding security policy to a user account of the requestor or the first data resource. The operations can further include updating the status of the request in the database system.

In some implementations, the entry function and the access function are executed based on the operations further including activating the entry function and the access function on the first endpoint. In some implementations, activating the entry function and the access function includes interfacing with the first data resource to apply the payload in enforcing the at least one security parameter or compliance parameter and processing the request for access.

In some implementations, the entry function includes defining a criteria determining an eligibility of the request for processing, the operations further including executing the entry function by recording the request including the payload and a corresponding request identifier in the database system, logging the status as initiated, verifying the payload, transmitting a confirmation response to a requestor computing system indicating acceptance of the request, invoking the access function. In some implementations, the access function includes defining an access restriction or an authentication restriction of the first data resource, the operations further including executing the access function by in response to the invocation by the entry function, modifying the access level by adjusting the at least one access setting or permission based on one or more database parameters for a plurality of user roles or resource types, applying the corresponding security policy to the user account or the first data resource by adjusting or enforcing the access restriction or the authentication restriction based on the first type of access requested, generating a log report including information of the adjustment to the at least one of access setting or permission, an identity of the requestor, and a timestamp of the execution of the access function, storing the log report in the database system.

In some implementations, the adjustment of the at least one access setting or permission to the first data resource includes granting access or revoking access, and wherein satisfying the security parameter corresponds to a validation of a credential in the payload based on a plurality user authentication levels, and wherein satisfying the compliance parameter corresponds to a validation of the first type of access requested in the payload based on a plurality of access rules of the first data resource. In some implementations, the plurality of endpoints include a name-based endpoint, a data filter endpoint, a drop table endpoint, and a tag based endpoint, and wherein the initiating to the first endpoint is further based on access parameters in a plurality of payload fields of the payload. In some implementations, the access setting corresponds to a configuration parameter defining access controls to the first data resource, and wherein the permission corresponds to an access grant defining operations executable on the first data resource granted to the requestor.

One implementation of the present disclosure relates to a non-transitory computer readable medium (CRM) including instructions stored thereon that, when executed by one or more processors, cause the one or more processors to perform operations including receiving, via an application programming interface (API) gateway, a request for access by a requestor including a payload. The operations can further include initiating an endpoint command by invoking a first endpoint of a plurality of endpoints based on a first type of access requested in the request. The operations can further include generating, using an entry function of the first endpoint, a status of the request. The operations can further include logging, using the entry function of the first endpoint, the status of the request in a database system. The operations can further include verifying, using the entry function of the first endpoint, the payload and that the requestor satisfies at least one of a security parameter or a compliance parameter of a first data resource of the data lake environment. The operations can further include updating, using an access function of the first endpoint, at least one of an access setting or a permission to the first data resource according to the request, wherein updating includes using the access function to modify an access level and apply a corresponding security policy to a user account of the requestor or the first data resource. The operations can further include updating the status of the request in the database system.

In some implementations, the operations further include activating the entry function and the access function on the first endpoint. In some implementations, activating the entry function and the access function includes interfacing with the first data resource to apply the payload in enforcing the at least one security parameter or compliance parameter and processing the request for access.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

FIGS. 7A-B depict access request interfaces, according to some embodiments.

Figure 1:
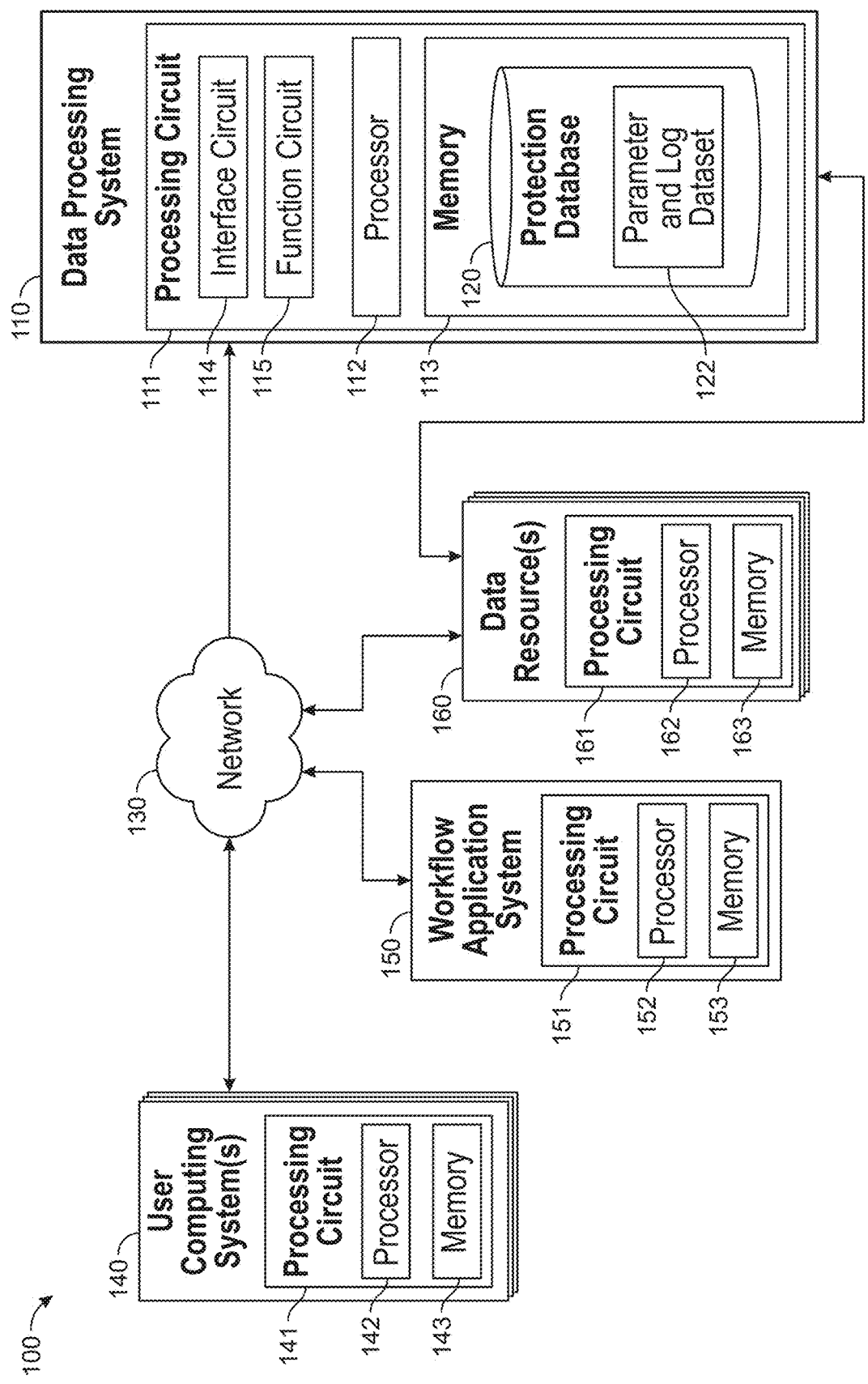
FIG. 1 is a block diagram of a provisioning system, according to some embodiments.

It will be recognized that some or all of the figures are schematic representations for purposes of illustration. The figures are provided for the purpose of illustrating one or more embodiments with the explicit understanding that they will not be used to limit the scope of the meaning the claims.

DETAILED DESCRIPTION

Overview

This disclosure relates to systems and methods for access provisioning using a data protection architecture. In some implementations, systems and methods can receive, via an application programming interface (API) gateway, a request for access by a requestor including a payload. The request can be used to invoke an endpoint based on the type of access requested in the request. In some implementations, an entry function can be used to generate and log a status of the request and verify the payload. In some implementations, an access function can also be used to update an access setting or permission to a data resource according to the request. For example, updating can include modifying an access level and applying a corresponding security policy to a user account of the requestor or the first data resource. Accordingly, the systems and methods provide technological improvements to enhance security and efficiency, reduce human error, and streamline data access processes, thereby optimizing computational resources and system integrity.

Various techniques, such as manual provisioning through cloud service consoles, can be used for access management but prove inefficient as organizational scale grows. This technique may require administrators to log into consoles and manually set permissions, which is impractical and inefficient for larger setups with many accounts. The manual nature of this process often leads to a repetitive, error-prone approach that consumes significant administrative resources, lacks scalability, and fails to provide auditing and monitoring capabilities. This inefficiency in data security management leads to the computing system being vulnerable to unauthorized access and data breaches as well as causes delays in authorized parties being able to access the data.

Another possible technique involves using infrastructure as code platforms to systematically manage resources. However, the complexity and multistep nature of this method, which may require coordination among different team members, make it time-consuming and resource-intensive. This technique still necessitates manual intervention for coding and review, thereby consuming considerable processing power and increasing the likelihood of human error, particularly in complex environments.

Additionally, some organizations employ techniques that provide programmatic access granting but fail to integrate these capabilities with an access request system and lack monitoring capabilities. The absence of an integrated management system obfuscates the structured handling and tracking of access requests, leading to administrative delays and a lack of transparency. Furthermore, the lack of effective monitoring tools means that systematically overseeing and auditing access patterns and behaviors becomes a challenge, thereby consuming additional processing resources and increasing the risk of security breaches due to inappropriate access levels. Accordingly, these traditional methods demonstrate significant technical limitations when applied to modern, large-scale environments. They consume excessive computer resources, lead to inefficient data security management, and can leave computing systems vulnerable.

To address the identified limitations in traditional access provisioning methods, the systems and methods described herein implement a data protection architecture that automates the process using an API gateway and various functions. According to some embodiments, the architecture facilitates the streamlined handling of access requests by automating the execution of endpoint commands customized to the specific access requests and needs of users. The use of computing functions to automate validation, logging, and updating processes improves the efficiency of the system by reducing the processing time and eliminating manual intervention, thereby minimizing the risk of human error.

One technical advantage of various embodiments of the present disclosure is optimization of computing resource utilization through dynamic scaling, a feature of entry and access functions. This technological improvement allows the system to allocate processing power on-demand, reducing the resource utilization associated with static server setups. Additionally, the automation of security policy application and compliance checks through these functions further secures data access by verifying these measures are consistently applied without the variability introduced by human operators.

Another technical improvement provided by various implementations is the integration of monitoring and auditing capabilities that provide continuous tracking of all access provisioning activities. This technical feature can be used to detect and address any unauthorized access or procedural anomalies in real time or near real-time. The modular and API-driven architecture of the data protection system facilitates improved integration with various technology stacks, improving its utility and providing compatibilities across a range of data management environments. This integration extends the functionality of the system, maintaining its effectiveness as technological requirements and configurations change. Moreover, another aspect of the system and methods described herein is the enhancement of disaster recovery capabilities. The automated and modular technological implementation of the systems and methods provide expedited reinstatement of access permissions in the event of partial or complete system failures, thus maintaining business continuity and reducing potential downtime and associated costs.

Furthermore, the example systems and methods described herein provide a technical improvement over existing systems that typically require extensive manual intervention for access provisioning. This improvement is achieved through an automated self-service feature that supports a segregated duty model, differentiating roles between data owners and data producers. The use of reusable and modular code within various implementations facilitate improved packaging and deployment across different environments, enhancing scalability and maintenance and providing consistent enforcement of access control policies. The implementations improve the access provisioning process and reduce the potential for human error and security breaches.

Example Access Provisioning Using a Data Protection Architecture

Referring to FIG. 1, a block diagram of a provisioning system 100 is shown, according to some embodiments. The provisioning system 100 is shown to include a data processing system 110, protection database 120, user computing system 140, workflow application system 150, and data resources 160. The components of the provisioning system 100 may be connected, or in communication, via a network 130. Network 130 may include computer networks such as the Internet, local, wide, metro or other area networks, intranets, satellite networks, other computer networks such as voice or data mobile phone communication networks, combinations thereof, or any other type of electronic communications network. Network 130 may include or constitute a display network. In some embodiments, network 130 facilitates secure communication between components of provisioning system 100. As a non-limiting example, network 130 may implement transport layer security (TLS), secure sockets layer (SSL), hypertext transfer protocol secure (HTTPS), and/or any other secure communication protocol. It should be noted that the number and type of components shown are merely illustrative, and in some embodiments, implementations of the provisioning system 100 may have additional, fewer, and/or different components than those illustrated in FIG. 1.

The network 130 can facilitate communication between various nodes, such as the data processing system 110, the user computing system 140, the workflow application system 150, and the data resources 160. In some embodiments, data flows through the network 130 from a source node to a destination node as a flow of data packets, e.g., in the form of data packets in accordance with the Open Systems Interconnection (OSI) layers. A flow of packets may use, for example, a OSI layer-4 transport protocol such as the User Datagram Protocol (UDP), the Transmission Control Protocol (TCP), or the Stream Control Transmission Protocol (SCTP), transmitted via the network 130 layered over a OSI layer-3 network protocol such as Internet Protocol (IP), e.g., IPv4 or IPv6. The network 130 can be composed of various network devices (nodes) that are communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to be from outside the AS network) and is generally managed by a single administrative entity (e.g., a system operator, administrator, or administrative group).

Generally, the data processing system 110, user computing system 140, workflow application system 150, and data resources 160 can include one or more logic devices, which can be one or more computing devices equipped with one or more processing circuits (e.g., processing circuit(s) 111, processing circuit(s) 141, processing circuit(s) 151, processing circuit(s) 161) that run instructions stored in a memory device (e.g., memory 113, memory 143, memory 153, and memory 163) to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The data processing system 110, user computing system 140, and workflow application system 150 may also include one or more databases for storing data, such as protection database 120, that receive and provide data to other systems and devices on the network 130.

Each system or device in provisioning system 100 may include one or more processors, memories, network interfaces (sometimes referred to herein as a "network circuit") and user interfaces. The memory (e.g., memory 113, memory 143, memory 153, and memory 163) may store programming logic that, when executed by the processor (e.g., processor(s) 112, processor(s) 142, processor(s) 152, and processor(s) 162) controls the operation of the corresponding computing system or device. The memory may also store data in databases. For example, memory 113 may store programming logic that when executed by processor 112 within processing circuit 111, causes protection database 120 to update parameters or store a system or event log. The network interfaces may allow the computing systems and devices to communicate wirelessly or otherwise. The various components of devices in provisioning system 100 may be implemented via hardware (e.g., circuitry), software (e.g., executable code), or any combination thereof. Devices, systems, and components in FIG. 1 can be added, deleted, integrated, separated, and/or rearranged in various embodiments of the disclosure.

As will be discussed in greater detail below, the data processing system 110 may be configured to protect access to data of data resources 160. That is, data resources 160 may be various types of storage platforms, including data lakes, databases, and other data repositories, to which the data processing system 110 may execute the functions to control and monitor access to the data resources 160. The data processing system 110 can interact with the various systems of provisioning system 100 over network 130. In some embodiments, the data processing system 110 can include one or more processing circuits 111, including processor(s) 112 and memory 113. The memory 113 may have instructions stored thereon that, when executed by processor(s) 112, cause the one or more processing circuits 111 to perform the various operations described herein. The operations described herein may be implemented using software, hardware, or a combination thereof. The processor(s) 112 may include a microprocessor, ASIC, FPGA, etc., or combinations thereof. In many implementations, processor(s) 112 may be a multi-core processor or an array of processors. Memory 113 may include, but is not limited to, electronic, optical, magnetic, or any other storage devices capable of providing processor(s) with program instructions. The instructions may include code from any suitable computer programming language. In some embodiments, the data processing system 110 can include an interface circuit 114 and function circuit 115.

In some embodiments, the interface circuit 114 may be configured to interface with the various systems and devices described herein. The interface circuit 114 may be configured to receive, via an application programming interface (API) gateway, a request for access by a requestor, including a payload. In some embodiments, the request may be received from the user computing system 140. For example, the user computing system 140 may send a request for access that includes user credentials and access parameters. In some embodiments, the request may be received from the workflow application system 150. For example, the workflow application system 150 may receive a request for access from the user computing system 140 through a portal of the workflow application system 150 and, in turn, trigger the API gateway by sending formatted API calls that specify the access request and associated data. Both the user computing system 140 and the workflow application system 150 can pass credentials and access parameters to the API gateway. In some embodiments, the API gateway may be configured to validate and route these requests to the appropriate serverless functions. For example, the API gateway may route requests as the request is received. In another example, the API gateway may be set to prioritize requests based on security levels and request urgency. In some embodiments, the interface circuit 114 may be configured to authorize a signature of the request on the API gateway by verifying digital signatures or other authentication tokens. For example, authorizing a signature can include checking the validity of the digital signature against known secure tokens to confirm the request's authenticity. Additionally, managed keys for authentication could be maintained in a secure vault or data storage system that is accessible throughout the processing pipeline. This vault could be queried by the interface circuit 114 to retrieve the necessary authentication keys or tokens when a request is received. For example, whenever a request for data access or a service call is initiated by either the user computing system 140 or the workflow application system 150, the interface circuit 114 could automatically access or retrieve keys from the secure vault. In this example, the function circuit 115 could later use the retrieved authentication keys (or request additional keys) to verify and authorize subsequent operations within the serverless functions it manages. After successful verification, the function circuit 115 could proceed to execute the requested tasks, such as data retrieval, update, or other API-driven actions.

In some embodiments, the data processing system 110 can be a distributed computing system, including at least a first computing system executing at least one of one or more processing circuits and a second computing system executing at least one of the one or more processing circuits. The interface circuit 114 may be configured to route the request and the payload to the first computing system or the second computing system based on a real-time status of either the first computing system or the second computing system. For example, when the first computing system is down to perform maintenance (e.g., real-time status), the interface circuit 114 may redirect the incoming requests to the second computing system to maintain service continuity. In another example, the interface circuit 114 may balance the load by dynamically routing requests based on the current load and operational status of each computing system.

The interface circuit 114 may also be configured to initiate an endpoint command by invoking an endpoint of a plurality of endpoints based on a first type of access requested in the request. For example, the endpoint command may be initiated to verify user credentials and authorize access based on the security policies defined in the system. In another example, the endpoint command may be used to update or modify user access levels in real-time based on administrative commands. Initiating an endpoint command may invoke or call an endpoint using a request. For example, the request may be to a specific URL where an API is listening, in order to initiate an action or retrieve data. In this example, various endpoints may correspond to a specific function or service offered by the API. In some embodiments, the request could be of various types, such as, but not limited to, GET, POST, PUT, DELETE, etc. When an endpoint command is initiated, the function circuit 115 may be requested to perform a specific set of operations defined by that endpoint. Additionally, when initiating an endpoint command, the payload and request may be transmitted as parameters in the URL or through a header. In some embodiments, the selected endpoint may be determined by the type of request (e.g., read, write, or administrative access), for example, to access a data lake. That is, the type of access requested may be an access parameter used by the interface circuit 114 to determine the appropriate security protocols and data handling procedures. For example, an access parameter may be a user role or clearance level that determines the scope of access permissions.

In some embodiments, the function circuit 115 may be configured to execute and/or perform various types of serverless functions, including but not limited to Lambda functions, anonymous functions, triggers, hooks, and/or microservices that may communicate with data lakes and other data storage systems (e.g., the data resources 160). The functions may process requests by interfacing with data lake environments to perform a plurality of operations. For example, one or more functions may be performed to manage access control, including the granting and revocation of permissions to the data resources 160. In another example, one or more functions may be performed to retrieve data, transform data, manage the data storage, and/or implement access controls based on predefined policies or parameters. In yet another example, one or more functions may be performed to initiate data streaming from various sources, enforce data integrity checks, and/or automate backup and recovery procedures. The function circuit 115 may communicate with other cloud services to facilitate real-time data processing. In some embodiments, the function circuit 115 can integrate with external APIs to extend functionality, such as interfacing with artificial intelligence (AI) and machine learning (ML) models to update the requestor with an appropriate status after access grants are performed. In some implementations, the systems and methods may be used to provision data access in an Amazon Web Services (AWS) data lake environment. In other implementations, they can be used to provision data lake access in various other types of data lake environments.

As used herein, a "function" refers to a programmable unit(s) of code that can execute specific tasks within any architectural setup (e.g., serverless architecture, microservice architecture, event-driver architecture, platform-as-a-service (PaaS) architecture). For example, a Lambda function may be configured and executed to grant name-based access to data resource 160. In another example, an anonymous function may be configured and executed to manage data filters of data resource 160. In yet another example, a microservice may be configured and executed to perform tag-based permissions on data resource 160. The functions may operate individually or in combination (e.g., sequentially or in parallel) to manage access and configuration actions within the data resources 160. In some embodiments, when a request for access or revocation is submitted, it may include a payload with various fields for processing the request. The function circuit 115, operating on one or more processing circuits (e.g., computing system 600 of FIG. 6), may receive this payload and use the included data—such as user identifiers, requested access levels, specific data filters or tags, and compliance parameters—to trigger one or more appropriate functions.

Generally, the entry functions and access functions can be activated on an endpoint of the plurality of endpoints. The interface circuit 114 can activate the endpoint based on specific conditions, such as the type of request received or security credentials provided. The entry function can define criteria for determining the eligibility of the request for processing. That is, the entry function can be used to evaluate whether the incoming request meets protocols and data policy requirements before processing. The access function can define an access restriction or an authentication restriction of data resource 160. That is, the access function may grant or revoke access to the data resource 160 and may enforce access limits. Additionally, the access function may apply the granted access to an account of the requestor.

The function circuit 115 may be configured to generate, using an entry function of the endpoint, a status of the request. In some embodiments, the entry function may be unique to the particular endpoint of a plurality of endpoints. For example, an entry function may correspond to a particular API endpoint. The particular API may be selected based on a type of request received. The function circuit 115 may also be configured to log, using an entry function of the endpoint, the status of the request in the protection database 120. In some embodiments, the entry function described herein can be triggered when a request is received (e.g., through an endpoint, API Gateway, or another trigger). The entry function can generate and log entries in a database table, such as parameter and log dataset 122 of protection database 120. For example, the log entry can include a ticket number, status (e.g., initiated) and other payload details. The payload may contain information about the request, such as but not limited to, a user ID, principal information (e.g., role, account, user), access requirements, sub-producer (e.g., true or false), ticket number, table name, server location, requestor type (e.g., producer or consumer), access type, team information, workgroup information, contact information, request source, etc. For example, the entry function can record the initiation status of the request in the parameter and log dataset 122 and track a completion status of the request.

The function circuit 115 may also be configured to verify, using the entry function of the endpoint, the payload and that the requestor satisfies at least one security parameter or a compliance parameter of the data resource 160 of a data lake environment. In some embodiments, verifying can include the entry function performing checks against security configurations and policy guidelines. That is, the payload and the requestor can be cross-referenced against the parameter and log dataset 122, including authorized users and permissible actions. For example, the entry function can validate the request parameters against set thresholds and conditions of the parameter and log dataset 122. The interface circuit 114 may transmit a response back to the requestor indicating whether the request was accepted by the function circuit 115. If the payload is missing data (e.g., necessary to complete the request), the interface circuit 114 can transmit a failure message. In some embodiments, upon successful logging and verification of the request, the entry function can invoke the access function.

In some embodiments, entry function (e.g., operated and/or executed by the interface circuit 114) can identify the at least one security parameter or compliance parameter is unsatisfied. For example, a parameter may be unsatisfied when the requested actions exceed the user's access privileges or fail to meet regulatory compliance standards. The interface circuit 114 may then transmit a failure message to a requestor computing system (e.g., user computing system 140 or workflow application system 150) including the at least one security parameter or compliance parameter being unsatisfied. In some embodiments, the interface circuit 114 may receive a payload updated to satisfy the at least one security parameter or compliance parameter. For example, the updated payload may include revised access levels or corrected user credentials. The updated payload may be reprocessed by the interface circuit 114 and function circuit 115.

The function circuit 115 may also be configured to update, using an access function of the endpoint, at least one of the access settings or permissions to the data resource 160 according to the request. The update may include using the access function to modify an access level and apply a corresponding security policy to a user account of the requestor or the data resource 160. In some embodiments, in response to the invocation by the entry function, the access function may modify the access level by adjusting the at least one access setting or permission based on one or more database parameters for a plurality of user roles or resource types. For example, adjustments to the at least one access setting or permission to the first data resource may include granting access or revoking access. In some embodiments, the access setting may be a configuration parameter defining access controls to the data resource 160. For example, the access setting may be defined as a user-specific data access profile that includes read, write, and modify permissions. For example, permission may be specified as operational privileges granted to the user, allowing specific actions on designated data resources.

For example, using both the interface circuit 114 and function circuit 115, an insurance company could manage sensitive data such as policy details and claims. In this example, an insurance agent may need to update a client's policy based on a recent claim. The agent can submit a request through a user interface, which routes through the interface circuit 114 via an API gateway. The interface circuit 114 can validate the agent's credentials and digital signature against security protocols to authenticate the request. Once authenticated, the interface circuit 114 can initiate an endpoint command to a specific API set up to handle policy updates, managed by the function circuit 115. Further, in this example, the function circuit 115 can then activate a serverless function to process policy updates. This function could retrieve existing policy data, verify claim details, and update the policy terms. Additionally, all the actions could be logged in a protection database 120 for auditing and monitoring, maintaining a record of data access and modifications. Upon successful update, the interface circuit 114 can send a confirmation back to the agent's system, detailing the updated policy terms. In another example, using both the interface circuit 114 and function circuit 115, an insurance company could manage sensitive data such as customer claims histories (e.g., database or table). In this example, an insurance adjuster may need to access a client's claim history based on a recent claim submission. The adjuster can submit a request through a user interface, which routes through the interface circuit 114 via an API gateway. The interface circuit 114 can validate the adjuster's credentials and digital signature against security protocols to authenticate the request. Once authenticated, the interface circuit 114 can initiate an endpoint command to a specific API set up to handle claims data access, managed by the function circuit 115. Further, in this example, the function circuit 115 can then activate a serverless function to process claims data access. This function could retrieve existing claims data, verify claim details, and provide the necessary data for evaluation. Additionally, all the actions could be logged in a protection database 120 for auditing and monitoring, maintaining a record of data access and modifications. Upon successful data retrieval, the interface circuit 114 can send the claims data back to the adjuster's system, detailing the requested claim history.

Additionally, the access function (e.g., operated and/or executed by the function circuit 115) may apply the corresponding security policy to a user account or the data resource 160 by adjusting or enforcing the access restriction or the authentication restriction based on the type of access requested. For example, adjusting or enforcing may include applying encryption standards and access limits as per organizational security policies. In some embodiments, the access function may generate a log report, including information of the adjustment to the at least one of the access settings or permissions, an identification of the requestor, and/or a timestamp of the execution of the access function. For example, the log report may include information documenting the changes made and/or the functions executed that granted access. Furthermore, the access function may store the log report in the parameter and log dataset 122 of protection database 120.

Accordingly, activating the entry function and the access function may include the interfacing, by the function circuit 115, with the data resource 160 to apply the payload in enforcing the at least one security parameter or compliance parameter and processing the request for access. A security parameter may correspond to a validation of a credential in the payload based on a plurality of user authentication levels. For example, the security parameter may be a multi-factor authentication requirement that must be satisfied to validate user identities.

A compliance parameter may correspond to a validation of the type of access requested in the payload based on a plurality of access rules of the data resource 160. For example, the compliance parameter may be an audit compliance rule that may be used to confirm all access modifications are recorded and justified. In some embodiments, the entry function and the access function may be serverless functions corresponding to an execution of a set of actions within a workflow of the access provisioning. For example, the serverless functions may be structured to execute a subset of actions within the first workflow of the access provisioning. That is, the serverless functions may be configured to process and execute different actions of access control and system auditing independently and automatically. Additional details of the entry and access functions are discussed below.

The function circuit 115 may also be configured to update the status of the request in the protection database 120. For example, the parameter and log dataset 122 can be updated to indicate a completion status of the request. That is, the status of the request can be monitored and updated through the provisioning processing of the function circuit 115. For example, the interface circuit 114 and function circuit 114 may periodically audit and refresh the security credentials and access rights based on security policy updates. In some embodiments, the interface circuit 114 may also be configured to transmit a response to the request for access to the user computing system 140 and/or workflow application system 150, including an indication of a successful processing of the request. For example, the response may include confirmation of the updated access rights or a summary report of the actions completed during the request processing. The transmission of the response may be in response to updating the status of the request. Additionally, updating the status can include creating a new entry in the parameter and log dataset 122 that records the request details and/or ticket details. For example, the new entry could include fields such as the request ID, user ID, date and time of request initiation, and the specific action requested. Additionally, the entry could indicate success or failure details of the request. For example, it could record the outcome as "successful" if the request is processed without errors, or "failed" with an error code and description if there are issues during processing.

As discussed herein, some embodiments may utilize machine learning, generative artificial intelligence, or other advanced computing techniques. In some embodiments, generative artificial intelligence (GenAI) models (also referred to as generative machine learning (ML) models) and/or other AI/ML models discussed herein may be implemented via and/or coupled to the interface circuit 114 or function circuit 115. For example, these circuits could employ AI-driven serverless functions such as Lambda functions, which may utilize both supervised and unsupervised learning techniques. In another example, AI-driven functions can automate decision-making processes, validate digital signatures, and authenticate requests for security and compliance. These techniques could be followed by, or used in conjunction with, reinforcement learning strategies. Additionally, in some embodiments, the interface circuit 114 or function circuit 115 may be configured to implement machine learning, facilitating the learning and adapting of the data processing system 110 operations without being explicitly programmed. Machine learning and artificial intelligence can be implemented through a variety of methods and algorithms. In one exemplary embodiment, a machine learning module within these circuits may be configured to implement these ML methods and algorithms to manage requests, authenticate users, and ensure data security and compliance efficiently.

In some embodiments, the systems and methods presented herein could be applied within the insurance sector and insurance systems to access and maintain insurance-related data. For example, the interface circuit 114 can facilitate the processing of requests via an API gateway, including access to or modification of insurance policies and claims information. Function circuit 115 can execute functions to validate policyholder data, update claim statuses, or adjust policy details. That is, the functions can manage insurance data across distributed systems, including data lakes, supporting real-time data processing within insurance systems.

Referring still to FIG. 1, according to some embodiments, the data processing system 110 is configured to communicate with components of the provisioning system 100. For example, requests and/or data associated with the user computing system 140 and/or the workflow application system 150 may be communicated to the data processing system 110 (e.g., via the network 130). Information and/or data associated with the data resources 160 and/or protection database 120 may also be communicated to the data processing system 110 (e.g., via the network 130).

In some embodiments, the data processing system 110 is implemented using cloud computing services. In some embodiments, the data processing system 110 is implemented using one or more computing devices, for example, operating alone and/or in combination. In some embodiments, the data processing system 110 is implemented using computing architectures like multiple distributed servers, and/or similar computing devices and/or systems. In some embodiments, the data processing system 110 is another suitable computing system, for example, distributed across multiple systems or devices (e.g., which may be located within a single building or facility, or distributed across multiple different buildings or facilities), or within a single computer (e.g., one server, housing, etc.). All such implementations are contemplated herein.

As shown, the data processing system 110 may be configured to communicate with the user computing system 140. In some embodiments, the user computing system 140 can include one or more processing circuits 141, including processor(s) 142 and memory 143. The memory 143 may have instructions stored thereon that, when executed by processor(s) 142, cause the one or more processing circuits 141 to perform the various operations described herein. The operations described herein may be implemented using software, hardware, or a combination thereof. The processor(s) 142 may include a microprocessor, ASIC, FPGA, etc., or combinations thereof. In many implementations, processor(s) 142 may be a multi-core processor or an array of processors. Memory 143 may include, but is not limited to, electronic, optical, magnetic, or any other storage devices capable of providing processor(s) with program instructions. The instructions may include code from any suitable computer programming language.

In some embodiments, the user computing system 140 may send formatted requests to the data processing system 110 to manage permissions within the data resources 160. That is, the data processing system 110 can receive a request to grant or revoke access to a data resource of the plurality of data resources 160. For example, the protection system 110 may verify the user's credentials and determine the level of access permitted, prior to granting or revoking access to the data resource. The user computing system 140 (sometimes referred to herein as a "mobile device," "user device," or "client device") may be a cloud computing system, desktop computing system, mobile computing device, smartphone, tablet, smart watch, smart sensor, or any other device configured to facilitate providing access requests and receiving, displaying, and interacting with content (e.g., web pages, mobile applications, etc.). The user computing system 140 can include an application to submit access requests and receive and display content from the other systems and devices described herein. For example, the application may be a web browser. Additionally, or alternatively, the installed application may be a mobile application. The user computing system 140 can communicate data over network 130.

Additionally, the data processing system 110 may be configured to communicate with the workflow application system 150. In some embodiments, the workflow application system 150 can include one or more processing circuits 151, including processor(s) 152 and memory 153. The memory 153 may have instructions stored thereon that, when executed by processor(s) 152, cause the one or more processing circuits 151 to perform the various operations described herein. The operations described herein may be implemented using software, hardware, or a combination thereof. The processor(s) 152 may include a microprocessor, ASIC, FPGA, etc., or combinations thereof. In many implementations, processor(s) 152 may be a multi-core processor or an array of processors. Memory 153 may include, but is not limited to, electronic, optical, magnetic, or any other storage devices capable of providing processor(s) with program instructions. The instructions may include code from any suitable computer programming language.

In some embodiments, the workflow application system 150 may serve as an intermediary, facilitating the submission of access requests from various user computing systems 140. That is, the data processing system 110 can receive a request to grant or revoke access to a data resource of the plurality of data resources 160. For example, the workflow application system 150 may provide a portal for the user computing system 140 to submit access requests. In this example, the workflow application system 150 may then validate the requests before forwarding them to the data processing system 110, such that the requests may satisfy organizational and/or security standards. The workflow application system 150 may be a cloud computing system, desktop computing system, mobile computing device, smartphone, tablet, smart watch, smart sensor, or any other device configured to facilitate providing access requests and receiving, displaying, and interacting with content (e.g., web pages, mobile applications, etc.). The workflow application system 150 can include an application to submit access requests and receive and display content from the other systems and devices described herein. The workflow application system 150 can communicate data over network 130.

As shown, the data processing system 110 may be configured to communicate with the data resources 160. In some embodiments, the data resources 160 can include one or more processing circuits 161, including processor(s) 162 and memory 163. The memory 163 may have instructions stored thereon that, when executed by processor(s) 162, cause the one or more processing circuits 161 to perform the various operations described herein. The operations described herein may be implemented using software, hardware, or a combination thereof. The processor(s) 162 may include a microprocessor, ASIC, FPGA, etc., or combinations thereof. In many implementations, processor(s) 162 may be a multi-core processor or an array of processors. Memory 163 may include, but is not limited to, electronic, optical, magnetic, or any other storage devices capable of providing processor(s) with program instructions. The instructions may include code from any suitable computer programming language.

In some embodiments, the data resources 160 may include a variety of storage types, such as databases, data lakes, and other data storage systems where operations, such as access management may be executed. The data processing system 110 may interact with the data resources 160 by sending API calls that specify access control instructions based on the results of access request analysis. For example, the API calls may modify, grant, or revoke user permissions within the data lake's access management layers of the data resources 160. The data processing system 110 may be configured to communicate with the data resources 160 to perform actions such as granting or revoking access based on the access requests received from the workflow application system 150 or from user computing system 140. For example, the actions can include translating the access permissions into actionable commands that modify access controls directly at the data storage level of the data resources 160. In some embodiments, a first data resource may be a data lake where structured and unstructured data is stored and queried. In some embodiments, a second data resource may be a relational database management system (RDBMS) used for transactional processes and structured query operations.

Example Data Processing/Protection System

Figure 2:
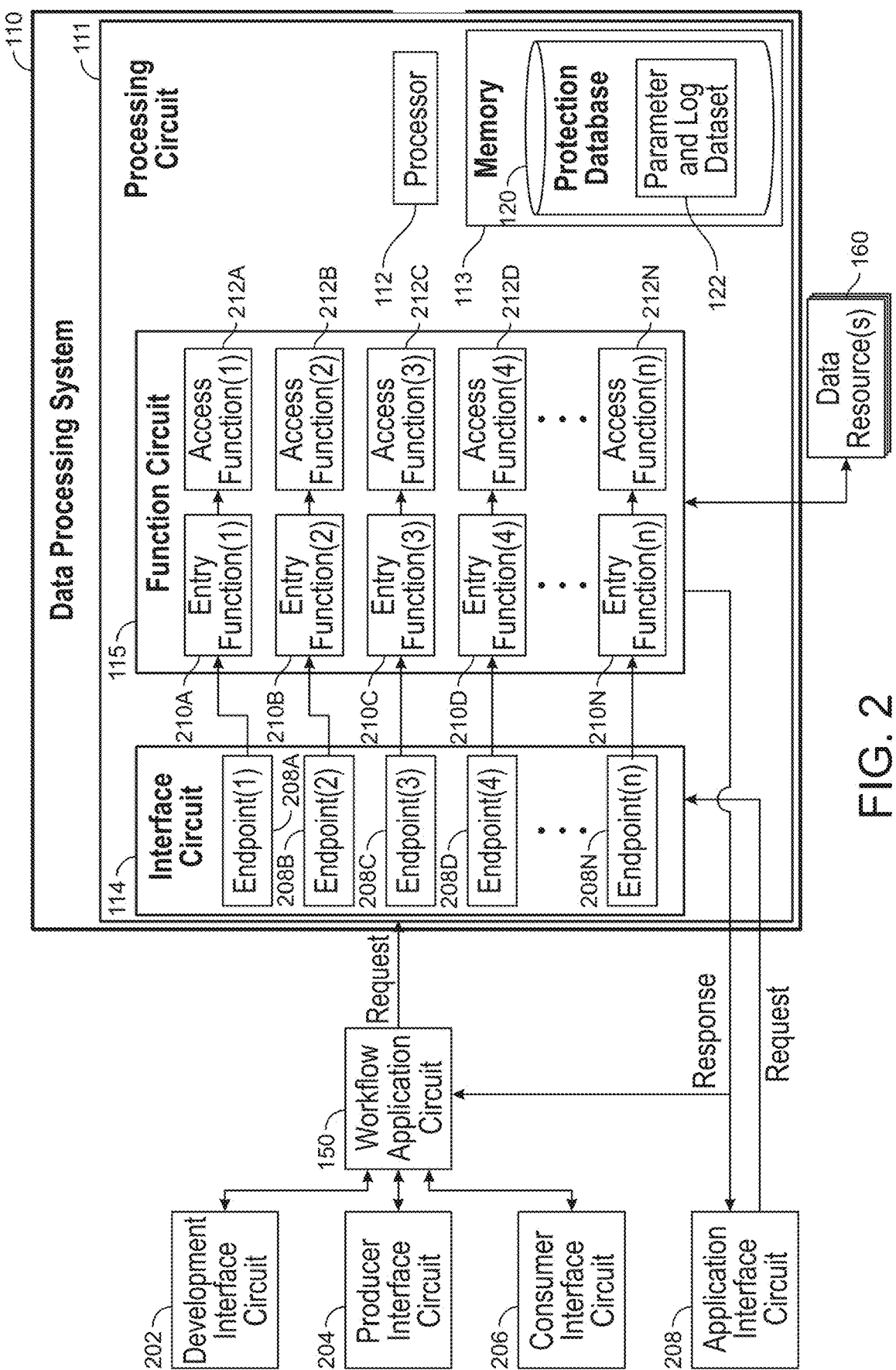
FIG. 2 is a block diagram further illustrating the provisioning system, according to some embodiments.

Referring now to FIG. 2, a block diagram further illustrating the data processing system 110 in greater detail is shown, according to some embodiments. Each system or device in data processing system 110 of FIG. 2 may also include one or more processors, memories, network interfaces (sometimes referred to herein as a "network circuit") and user interfaces. The memory (e.g., memory 113, memory 153, and memory 163) may store programming logic that, when executed by the processor (e.g., processor(s) 112, processor(s) 152, and processor(s) 162) controls the operation of the corresponding computing system or device. The memory may also store data in databases. For example, memory 113 may store programming logic that when executed by processor 112 within processing circuit 111, causes protection database 120 to update parameters or store a system or event log. The network interfaces may allow the computing systems and devices to communicate wirelessly or otherwise. The various components of devices in data processing system 110 may be implemented via hardware (e.g., circuitry), software (e.g., executable code), or any combination thereof. Devices, systems, and components in Figure can be added, deleted, integrated, separated, and/or rearranged in various embodiments of the disclosure.

As discussed above, the data processing system 110 may be configured to protect access to data of data resources 160. The interface circuit 114 and the function circuit 115 may be components of data processing system 110. The interface circuit 114 may be configured to receive the access requests (e.g., grant or revoke) from the workflow application system 150, described in greater detail above with reference to FIG. 1. Additionally, the interface circuit 114 may be configured to receive a request from the application interface circuit 208. In some embodiments, the development interface circuit 202, producer interface circuit 204, consumer interface circuit 206, and application interface circuit 208 may be a user computing system 140 of FIG. 1. For example, the development interface circuit 202 may be a platform for software developers to submit code changes that require access to revisions in the database. In another example, the producer interface circuit 204 may be a portal through which data producers can request data publication permissions in the data lake. In yet another example, the consumer interface circuit 206 may be an access point for data consumers to request data consumption rights. In yet another example, the application interface circuit 208 may be an integration point for third-party applications to obtain data access through API interactions.

One or more of the interface circuits may interface with the workflow application system 150 or directly with interface circuit 114 of the data processing system 110. For example, one or more of the interface circuits may submit a permission request (e.g., a type of access request) to obtain permission to access data managed by a lake formation database (e.g., data resource 160). In another example, one or more of the interface circuits may submit a sharing request (e.g., a type of access request) to share data across an organization managed by a lake formation database.

In some embodiments, when one or more interface circuits transmit a request to the workflow application system 150, the workflow application system 150 may validate and approve prior to transmitting (or posting) the request to the interface circuit 114. For example, the workflow application system 150 may validate and approve the request by verifying it against organizational access control policies and user credentials. In some embodiments, when one or more interface circuits (e.g., application interface circuit 208) transmit a request to the interface circuit 114, the interface circuit 114 may route the request to the appropriate endpoint for action based on the request's attributes and system logic. In some embodiments, the request can be submitted through a form or template provided by the workflow application system 150 and/or interface circuit 114. For example, the form or template may be a standardized digital document that captures details about the access being requested, such as user roles, data specifications, and access duration.

The interface circuit 114 can be configured to receive a communication with the request via a gateway. The gateway may be an API gateway, a web application gateway, a secure sockets layer (SSL) gateway, or any other network gateway configured for structured data exchanges. For example, the API gateway may be a managed service that receives API calls and implements authorization and access control for the requests. That is, the interface circuit 114 can provide a data-plane entry point for API calls, webhooks, or service mesh traffic, which enforces routing rules and policies. Additionally, the data-plane entry point may be monitored to maintain performance metrics and security standards.

The interface circuit 114 can also be configured to initiate or trigger one of many endpoints to process the request based on an endpoint command. That is, the interface circuit 114 may configure and manage the routing of requests to various endpoints based on predefined criteria and conditions, such as the type of access request received. For example, in response to receiving a request for access, the endpoint command can invoke or activate a first endpoint of a plurality of endpoints. Upon successful authentication, the gateway of the interface circuit 114 can automatically handle the invocation of the linked function to process the request. The endpoints may correspond with a particular set of functions executable and performable by the function circuit 115 to manage and apply the requested access changes within the data environment.

For example, in response to receiving a request for access, the endpoint command can invoke or activate a first endpoint of a plurality of endpoints by executing a security authentication sequence and subsequently forwarding the request to the targeted function. In another example, the endpoint command can invoke or activate a second endpoint of a plurality of endpoints by enacting a different security protocol tailored to the specific access level requested by the end user. The endpoints may correspond with a particular set of functions executable and performable by the function circuit 115 to manage and apply the requested access changes within the data environment.

The endpoints (e.g., endpoints 208A-N) may be gateway endpoints that provide an interface for routing requests to the appropriate functions, handling incoming requests and enforcing gateway-level security (e.g., rate limiting, authentication, and authorization). In some embodiments, the endpoints can provide a configurable responsive URL or URI that maps incoming requests to specific functions based on predefined rules. That is, the endpoints may serve as a defined entry point in a gateway that is configured to link requests to specific functions. For example, an endpoint can be matched to a request based on the interface circuit 114, that can analyze the request to determine which endpoint should handle it based on predefined rules. The predefined rules may be criteria such as the request type, request path, HTTP method, headers, or other parameters within the request. In general, one or more endpoints within the gateway may be configured with specific triggering logic that is defined in terms of which function to invoke when a request is routed to this endpoint. For example, the configuration specifies the functions to be triggered and the conditions under which the trigger should occur. Once the interface circuit 114 identifies the endpoint and confirms that the request meets the necessary conditions for that endpoint, interface circuit 114 invokes the linked one or more functions (e.g., entry functions 210A-N). For example, the invocation can include passing the request data to the function as input.

In some embodiments, the endpoint can be used to trigger a function when a request meeting certain criteria is received. The interface circuit 114 may analyze the incoming request's metadata (e.g., payload) to determine which endpoint should handle the request. This determination may be based on matching the request's attributes (e.g., payload fields) such as the type of access requested, the requestor's identity, or specific parameters included in the payload, against the routing rules defined for each endpoint. The endpoints can act as a reference point to invoke one or more functions, where the interface circuit 114 may pass the request data as input parameters.

In some embodiments, the endpoints 208A-N may be a pre-configured route according to a set of defined rules within the interface circuit 114. The set of defined rules define how to direct the flow and processing of data based on the request and payload. That is, the pre-configured route may be a set of network configurations and logic conditions within the interface circuit 114's firmware or software that determines and categorizes data packets, aligning them with the correct processing and/or forwarding protocol. For example, endpoint 208A may be a pre-configured route that activates specific function calls within the data processing system 110 of FIG. 1, mapping requests to one or more respective function handlers. For example, the endpoints 208A-N may operate or be employed as discrete addresses within the interface circuit 114. The discrete addresses can provide targets for routing and handling the access requests.

For example, endpoint 208A may be an interface for processing name-based grants or revocations. In this example, the endpoint 208A can correspond to a plurality of functions that can process name-based database grants, name-based database revokes, name-based table grants, and name-based table revokes (revocation). When the interface circuit 114 receives a request, endpoint 208A can be identified based on the payload of the request (e.g., type, user requesting, size, etc.). Once identified, the interface circuit 114 may invoke the linked functions, passing the request and payload to the linked functions for processing the name-based access changes. That is, the endpoint 208A serves as a pre-configured route within the interface circuit 114, that may be defined to match certain request patterns (e.g., related to name-based access controls) and subsequently provide these requests to the functions designed to fulfill the request patterns (e.g., entry function 210A and access function 212A).

In another example, endpoint 208B may be an interface for processing, creating, or updating data filters. In this example, the endpoint 208B can correspond to a plurality of functions that can process data filter requests. When the interface circuit 114 receives a request, endpoint 208B can be identified based on the payload of the request (e.g., type, user requesting, size, etc.). Once identified, the interface circuit 114 may invoke the linked functions, passing the request and payload to the linked functions for processing the data filter creation or update. That is, the endpoint 208B serves as a pre-configured route within the interface circuit 114, that may be defined to match certain request patterns (e.g., related to data filter creation and update controls) and subsequently provide these requests to the functions designed to fulfill the request pattern (e.g., entry function 210B and access function 212B).

In yet another example, endpoint 208C may be an interface for processing, dropping, or re-granting table access. In this example, the endpoint 208C can correspond to a plurality of functions that can process drop table requests. When the interface circuit 114 receives a request, endpoint 208C can be identified based on the payload of the request (e.g., type, user requesting, size, etc.). Once identified, the interface circuit 114 may invoke the linked functions, passing the request and payload to the linked functions for processing the table dropping or re-granting. That is, the endpoint 208C serves as a pre-configured route within the interface circuit 114, that may be defined to match certain request patterns (e.g., related to dropping or re-granting table access controls) and subsequently provide these requests to the functions designed to fulfill the request pattern (e.g., entry function 210C and access function 212C).

In yet another example, endpoint 208D may be an interface for processing tag-based grants or revocations. In this example, the endpoint 208D can correspond to a plurality of functions that can process tag-based grants and tag-based revokes. When the interface circuit 114 receives a request, endpoint 208D can be identified based on the payload of the request (e.g., type, user requesting, size, etc.). Once identified, the interface circuit 114 may invoke the linked functions, passing the request and payload to the linked functions for processing the tag-based changes. That is, the endpoint 208D serves as a pre-configured route within the interface circuit 114, that may be defined to match certain request patterns (e.g., related to tag-based access controls) and subsequently provide these requests to the functions designed to fulfill the request patterns (e.g., entry function 210D and access function 212D).

It should be understood N number of endpoints (e.g., endpoints (1)-(n)) can be provided by the interface circuit 114. For example, endpoint 208N may be an interface for processing user authentication and security clearance validations. In another example, endpoint 208N may be an interface for processing custom user queries and data retrieval operations. In yet another example, endpoint 208N may be an interface for processing batch data updates and synchronization tasks. Accordingly, various endpoints can be deployed within the interface circuit 114 based on specific operational needs and application requirements to improve data management and access control across data resources 160.

In some embodiments, the functions, once triggered, can execute code based on the input data. This execution is handled by the function circuit 115, which can automatically handle the function execution without manual intervention in server management. The function circuit 115 may be configured to execute and/or perform various types of serverless functions including, but not limited to, Lambda functions, anonymous functions, triggers, hooks, and/or microservices that may communicate with data lakes and other data storage systems (e.g., the data resources 160).

In some embodiments, entry functions 210A-N include defining a criteria determining an eligibility of the request for processing. The entry functions may record the request including the payload and a corresponding request identifier (e.g., ticket number) in the protection database 120 (e.g., in parameter and log dataset 122, shown in FIG. 1). Additionally, the entry functions may log the status as initiated (e.g., in parameter and log dataset 122 of protection database 120) and verify the payload of the request. Furthermore, the entry functions may transmit a confirmation response to a requestor computing system (e.g., development interface circuit 202, producer interface circuit 204, consumer interface circuit 206, and/or application interface circuit 208) indicating acceptance of the request. Moreover, the entry functions may invoke one or more corresponding access functions.

In some embodiments, access functions 212A-N include defining an access restriction or an authentication restriction of the data resource 160. The access functions may, in response to the invocation by an entry function, modify the access level by adjusting the at least one access setting or permission based on one or more database parameters for a plurality of user roles or resource types. The database parameters may be unique to a particular data resource 160. Additionally, the access functions may apply the corresponding security policy to the user account or the data resource 160 by adjusting or enforcing the access restriction or the authentication restriction based on the type of access requested. Furthermore, the access functions may generate a log report including information of the adjustment to the at least one of access setting or permission, an identity of the requestor, and a timestamp of the execution of the access function. Moreover, the access functions can store the log report in the protection database 120 (e.g., in parameter and log dataset 122, shown in FIG. 1).

For example, entry function 210A (executed by the function circuit 115) may receive the request and payload routed through endpoint 208A and then authenticate and log the details of the request in the system database. In this example, the entry function 210A may also validate the credentials and permissions associated with the request to confirm compliance with established access control policies. Once the entry function 210A is complete, the access function 212A may apply the access changes to the database or table of the data resource(s) 160 as specified in the request. Additionally, the access function 212A may update the request status and log the transaction details in the protection database 120.

In another example, entry function 210B (executed by the function circuit 115) may receive the request and payload routed through endpoint 208B and then analyze the criteria for data filter updates and verify the data integrity. In this example, the entry function 210B may also check for conflicts or issues with existing data filters before proceeding. Once the entry function 210B is complete, the access function 212B may implement the updates or creation of data filters in the data resource(s) 160 as specified in the request. Additionally, the access function 212B may update the request status and log the transaction details in the protection database 120.

In yet another example, entry function 210C may receive the request and payload routed through endpoint 208C and then analyze the requirements for dropping or re-granting table access. In this example, the entry function 210C may perform a security check to confirm the requestor has the authority to make such changes. Once the entry function 210C is complete, the access function 212C may execute the drop or re-grant operations on the specified tables in the data resource(s) 160. Additionally, the access function 212C may update the request status and log the transaction details in the protection database 120.

In yet another example, entry function 210D may receive the request and payload routed through endpoint 208D and then analyze the request to identify the specific tags involved and validate the tagging schema. In this example, the entry function 210D may also check for tagging rule compliance and potential security implications. Once the entry function 210D is complete, the access function 212D may apply or revoke the tag-based permissions in the data resource(s) 160. Additionally, the access function 212D may update the request status and log the transaction details in the protection database 120.

It should be understood N number of functions (e.g., entry functions (1)-(n) and access functions (1)-(n)) can be provided by the function circuit 115. For example, entry function 210N may process multi-layered access requests, confirming each layer of the request satisfies organizational and security protocols before executing a change in access. In this example, access function 212N may then execute the approved access changes, update the relevant data resources 160, and log all changes in the protection database 120. Accordingly, various functions can be deployed within the function circuit 115 based on the specific service requirements and operational strategies of the organization.

Once the various functions process the request, the function circuit 115 can return a response back. In some embodiments, the response may be provided through the gateway. For example, the response may include information of the access granted or revoked, including timestamps and affected data resources. In another example, the response may include status updates and error messages if the request could not be fully processed due to policy violations or other issues.

Exemplary Data Processing/Protection System and Functionality

Figure 3:
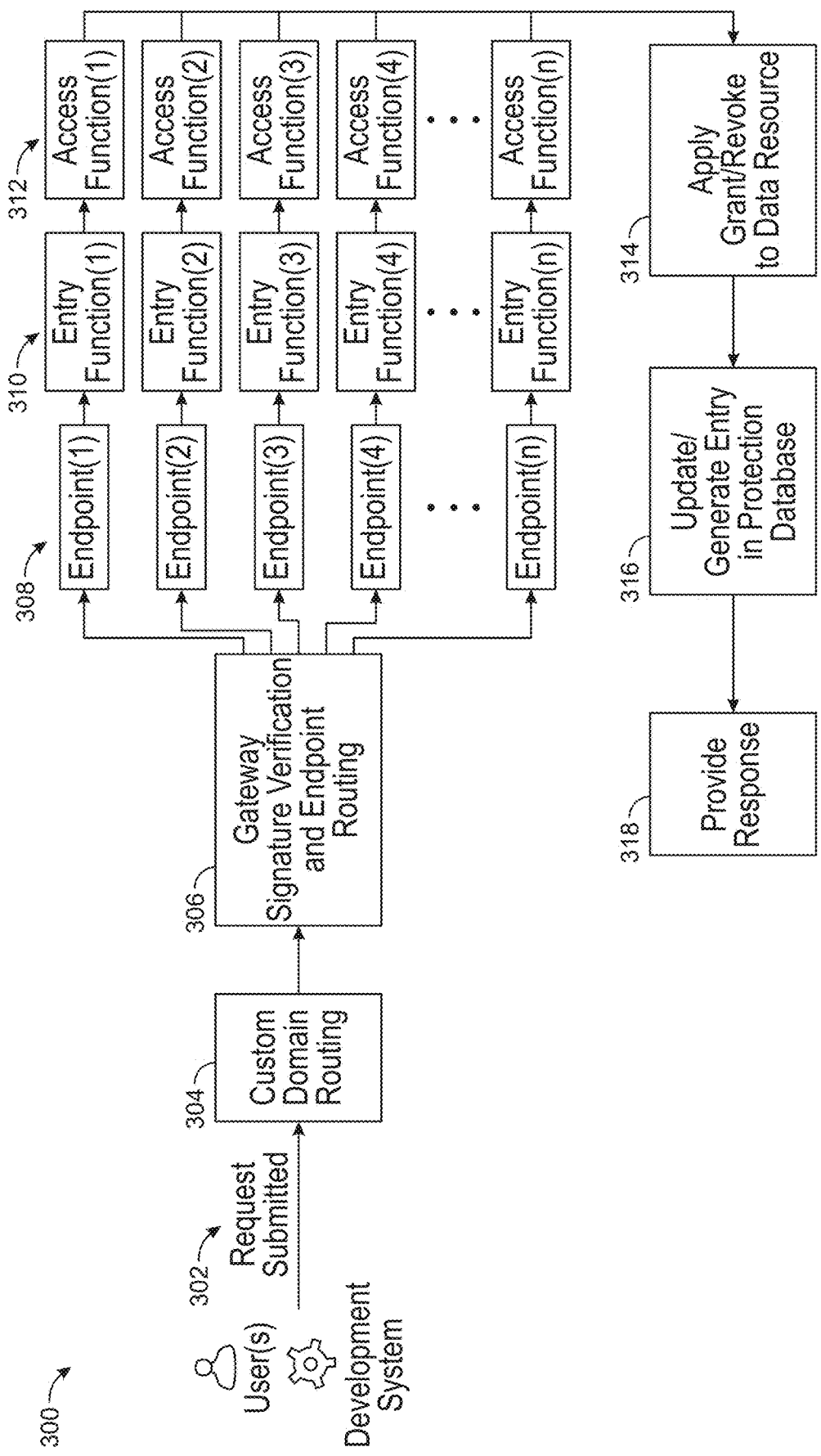
FIG. 3 is a flow diagram of a process of access provisioning, according to some embodiments.

Referring now to FIG. 3, a flow diagram of a process 300 of access provisioning, according to some embodiments. As discussed above, the data processing system 110 may be configured to perform process 300. Additional or fewer steps may be performed. At step 302, the access request may be submitted to the interface circuit 114 of data processing system 110 of FIG. 1. The access request may be submitted by users or a development system. At step 304, the interface circuit 114 may execute custom domain routing based on selecting a processing circuit or a computing system of a distributed computing system to process the request. For example, the request may be routed to a first computing system when a second computing system is down. In another example, the request may be routed to a second computing system.

At step 306, the interface circuit 114 may be configured to perform a gateway signature verification and endpoint routing. For example, a gateway signature verification may include checking the digital signatures attached to the request to confirm its authenticity and integrity. In another example, endpoint routing may include directing the request to the appropriate function based on the request's type and specified parameters. At step 308, the interface circuit 114 may utilize the endpoints to serve as an interface to route the request to an entry function. For example, the endpoint may activate the corresponding entry function based on the routing rules configured within the gateway. At step 310, the function circuit 115 of the data processing system 110 of FIG. 1 can execute one or more entry functions by logging and validating the request parameters. For example, the entry function may log the request details (e.g., in protection database 120). At step 312, the function circuit 115 can execute one or more access functions by applying the requested access changes to the appropriate data resources (e.g., in data resources 160). For example, the access function may modify user permissions (e.g., grant or revoke) or update resource settings (e.g., data filters, tags, drop tables) based on the validated request.

At step 314, the function circuit 115 may apply the grant, revoke, or another action to the data resource 160. In some embodiments, steps 312 and 314 may occur in a single step. That is, the access function may apply the grant, revocation, or another action to the data resource 160. For example, at step 314, the function circuit 115 may execute the access policies by granting or revoking permissions and logging the action. Additionally, at step 316, the function circuit 115 may update or generate an entry in the protection database 120. For example, the access function may update a status of a ticket corresponding with the request. Additionally, the access function may log the details of the request and actions performed into a log dataset of the protection database 120. At step 318, the function circuit 115 can provide a response. For example, the response may include confirmation of the actions taken, detailing any changes made or identifying any errors or exceptions during the process.

Figure 4:
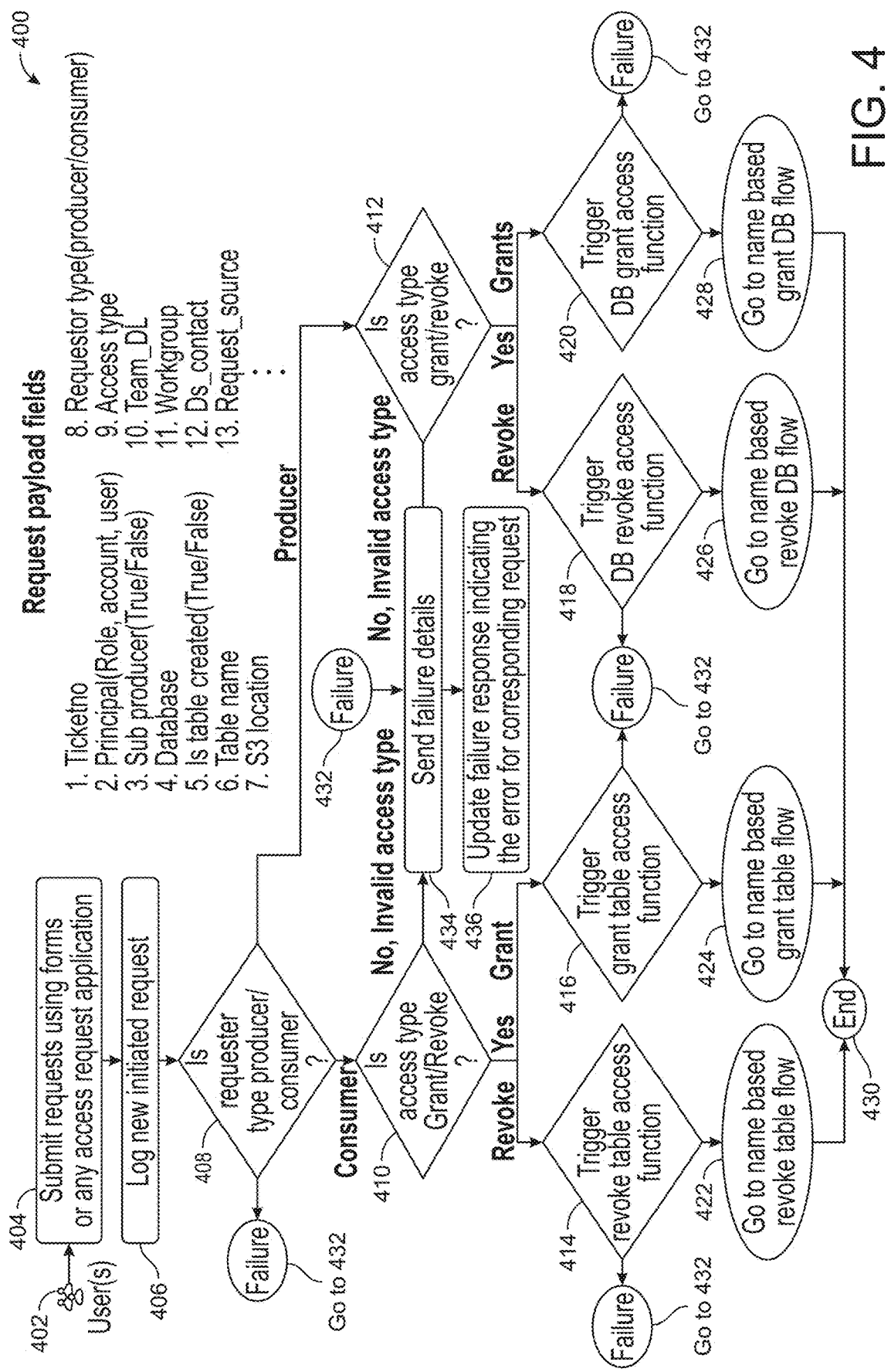
FIG. 4 is a flow diagram of a process of access provisioning, according to some embodiments.

Referring now to FIG. 4, a flow diagram of a process 400 of access provisioning, according to some embodiments. As discussed above, the data processing system 110 (also referred to herein as a "data protection system 110") may be configured to perform process 400. Additional or fewer steps may be performed. Generally, process 400 relates to a name-based grant or revocation entry function process. Upon completion of process 400, an access function can be invoked. Users 402 may submit a request at step 404. The request may be submitted using a form or any access request application. The request may include a payload including various data associated with the request. In some embodiments, each payload can include a plurality of payload fields such as, but not limited to, Ticket number (Ticketno) field, principal field (e.g., role, account, user), sub producer field (e.g., true or false), database field, table created field (e.g., true or false), table name field, S3 location field, requestor type field (e.g., producer or consumer), access type field, team_DL field, workgroup field, Ds_contact field, and request_source field. In some embodiments, one or more of the fields can be removed or added to the payload for various types of request processing by the data processing system 110.

The interface circuit 114 of data processing system 110 of FIG. 1 can receive the request at a gateway and initiate an endpoint command by invoking an endpoint of a plurality of endpoints based on a type of access requested in the request. At step 406, an entry function of function circuit 115 corresponding with the invoked endpoint can generate and log the request including payload details. The entry function may take as input request details, including the payload and any metadata, from the gateway, via the endpoint. That is, the endpoint routes the request to an entry function based on configured criteria and the input of the entry function may process these inputs.

At step 408, the entry function may determine if the requestor is a producer or a consumer. For example, the requestor may be a producer when one or more of the payload fields indicate a "producer" in the requestor type field. In another example, the requestor may be a consumer when one or more of the payload fields indicate a "consumer" in the requestor type field. If neither requestor is a producer nor a consumer, the process for access provisioning fails (go to step 432). Additionally, at step 408, the entry function may verify the payload and the requestor satisfies at least one of a security parameter or a compliance parameter of a data resource of a data lake environment. For example, satisfying a security parameter may include a validation of a credential in the payload based on a plurality user authentication level. In another example, satisfying a compliance parameter may include a validation of the type of access requested in the payload based on a plurality of access rules of the first data resource.

At step 410, if the requestor is a consumer, the entry function can determine if the access type is a grant or revoke (e.g., revocation). When the access type is a revoke, the entry function can invoke (or trigger) the access function for revoking the table access (at step 414). When the access type is a grant, the entry function can invoke the access function for granting the table access (at step 416). If steps 414 or 416 fail, the access provisioning fails (go to step 432). If step 414 is successful, the name-based revoke table flow corresponding with the access function can be processed by the function circuit 115 (at step 422). The entry function process may then end at step 430. If step 416 is successful, the name-based grant table flow corresponding with the access function can be processed by the function circuit 115 (at step 424). The entry function process may then end at step 430.

At step 412, if the requestor is a producer, the entry function can determine if the access type is a grant or revoke (e.g., revocation). When the access type is a revoke, the entry function can invoke (or trigger) the access function for revoking the database (DB) access (at step 418). When the access type is a grant, the entry function can invoke the access function for granting the DB access (at step 420). If steps 418 or 420 fail, the access provisioning fails (go to step 432). If step 418 is successful, the name-based revoke DB flow corresponding with the access function can be processed by the function circuit 115 (at step 426). The entry function process may then end at step 430. If step 420 is successful, the name-based grant DB flow corresponding with the access function can be processed by the function circuit 115 (at step 428). The entry function process may then end at step 430.

At step 432, upon a failure by the entry function executed by the function circuit 115 of data processing system 110 of FIG. 1, the function circuit 115 can, at step 434, generate and send failure details to the requestor (e.g., user computing system 140 and/or workflow application system 150). Additionally, the function circuit 115 can update parameter and log dataset 122 of protection database 120 to indicate the failure and update the status. At step 436, the function circuit 115 can update the failure response indicating the error for corresponding request.

Figure 5:
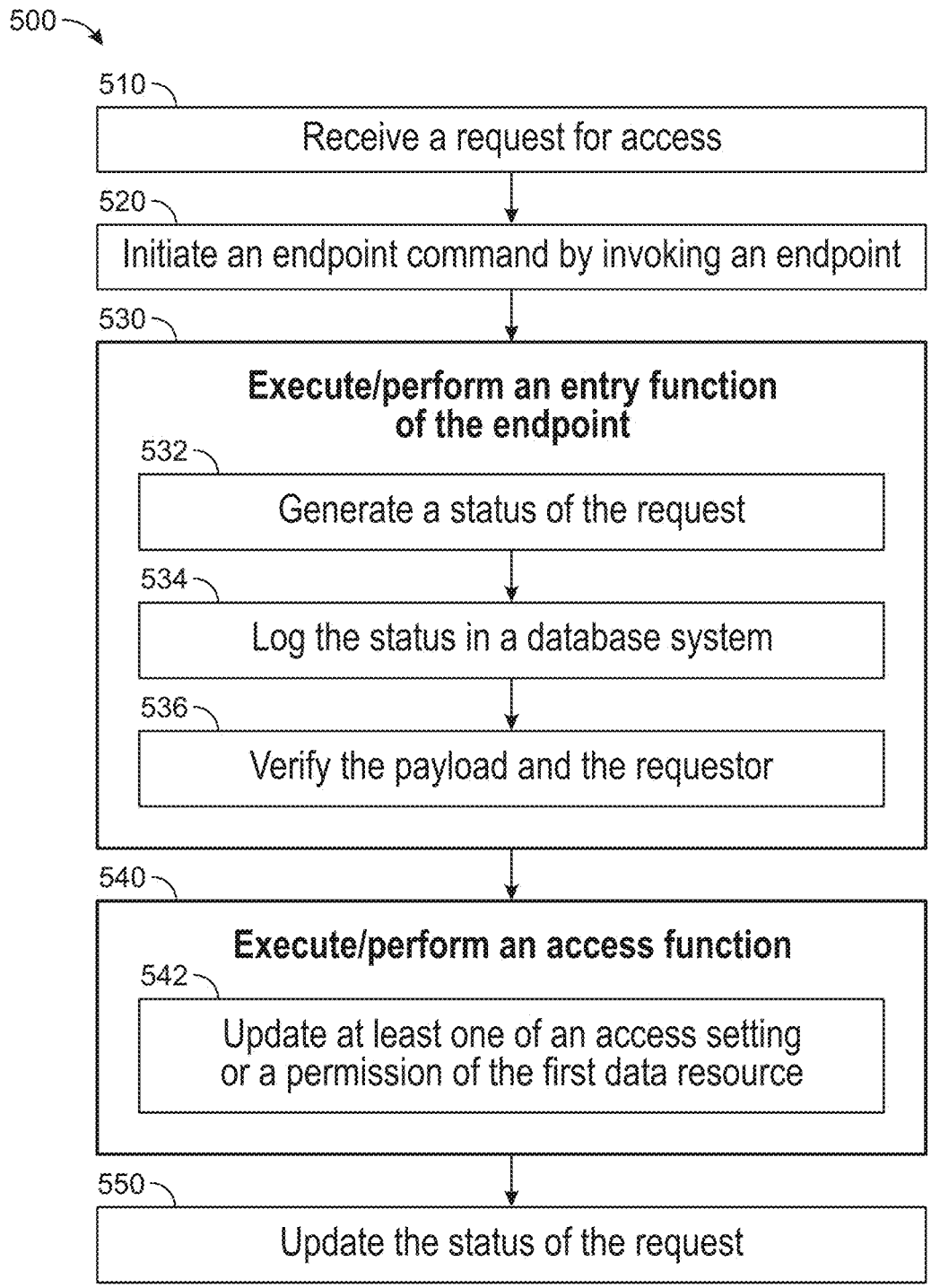
FIG. 5 is a flow diagram of a process of access provisioning, according to some embodiments.

Referring now to FIG. 5, a flowchart for a method 500 of access provisioning in a data lake environment is shown, according to some embodiments. The computing systems of FIG. 1 may be configured to perform method 500. Further, any computing device described herein can be configured to perform method 500.

In broad overview of method 500, at block 510, the one or more processing circuits may receive a request for access. At block 520, the one or more processing circuits may initiate an endpoint command by invoking an endpoint. At block 530, the one or more processing circuits may execute or perform an entry function of the endpoint. At block 540, the one or more processing circuits may execute or perform an access function. At block 550, the one or more processing circuits may update the status of the request. In addition, fewer, or different operations may be performed depending on the particular implementation. In some embodiments, some, or all operations of method 500 may be performed by one or more processors executing on one or more computing devices, systems, or servers. In some embodiments, each operation may be reordered, added, removed, or repeated.

At block 510, the processing circuits may receive, via an application programming interface (API) gateway, a request for access by a requestor including a payload. The payload may include various payload fields. The request may also include a signature or token (e.g., accessible from a vault API). In some embodiments, the processing circuits may authorize the signature or token of the request on the API gateway by verifying digital signatures or other authentication tokens. The API gateway may be configured to manage and authenticate access requests efficiently. That is, the API gateway can receive requests by the requestor transmitting encrypted credentials to specific service endpoints of the API gateway. For example, the requestor may transmit access details and security tokens, and the processing circuits may validate and authorize these before allowing access.

In some embodiments, the one or more processing circuits may be a distributed computing system including at least a first computing system executing at least one of the one or more processing circuits and a second computing system executing at least one of the one or more processing circuits. For example, in response to receiving the request, the processing circuits can route the request and the payload to the first computing system, or the second computing system based on a real-time status of either the first computing system or the second computing system. For example, the real-time status may be operational or overloaded. In another example, the real-time status may be maintenance mode or fully functional. In yet another, routing the request and the payload to the first computing system may occur when it offers lower latency or has fewer requests to handle. In yet another, routing the request and the payload to the second computing system may occur when it is designated for specific types of access requests, such as batch processing or complex queries.

At block 520, the processing circuits may initiate an endpoint command by invoking a first endpoint of a plurality of endpoints based on a first type of access requested in the request. In some embodiments, an endpoint command may analyze the request parameters to determine the suitable endpoint for processing. That is, the first endpoint can be invoked (or triggered) using an endpoint command by deploying routing rules that match the request attributes to the endpoint capabilities. For example, the endpoint command may be a dynamically configurable routing decision, and the first endpoint may be invoked by mapping the request based on the type of access requested. The type of request may be, but is not limited to, a named-based database or table request (e.g., grant or revoke), a data filter-based access request, a drop/re-grant access request, create or update data filter request, permissions modification request, or audit trail request. A request may have a corresponding endpoint used to route the request to an appropriate entry function of the plurality of entry functions. In some embodiments, the endpoints can include a name-based endpoint, a data filter endpoint, a drop table endpoint, a tag-based endpoint, a user management endpoint, and/or a system configuration endpoint. In some embodiments, initiating to the first endpoint may be based on access parameters in a plurality of payload fields of the payload. For example, the access parameter may be user role or requested resource type. In this example, the first endpoint may be initiated by evaluating the access parameter and matching it to the endpoint's functions such that the request is routed to a customized processing path.

For example, a named-based database or table request may initiate an access grant, revocation, or check of access controls and update permissions accordingly. In another example, a data filter-based access request may trigger a review of the current filter settings and apply necessary updates to refine data visibility. In yet another example, a drop/re-grant access request may temporarily suspend user access before re-establishing it under new conditions. In yet another example, a create or update data filter request may be a request for integrating new filter rules into the data lake environment's operations or update existing rules.

At block 530, the processing circuits may execute or perform an entry function of the first endpoint. Executing an entry function may include generating a status of the request (block 532). The entry function may be configured as a serverless function, a lambda function, an automated script, or a set of procedural commands. For example, the entry function may be a lambda function that can take the payload and user credentials as input. In this example, the input to the lambda function can then be analyzed to ensure all criteria are met for processing the access request. At block 532, the processing circuits may generate, using an entry function of the first endpoint, a status of the request. For example, the status can be associated with a ticket number, where the status can be monitored and updated through a dashboard or automated alerts. Executing an entry function may also include logging the status in a database system (block 534). At block 534, the processing circuits may log, using the entry function of the first endpoint, the status of the request in a database system (e.g., protection database 120, specifically in parameter and log dataset 122). The status may be maintained in the database system, for example, in parameter and log dataset 122 of protection database 120. For example, the log dataset may track changes, user interactions, and timestamp each event for auditing purposes.

Executing an entry function may also include verifying the payload and the requestor (block 536). At block 536, the processing circuits may verify, using the entry function of the first endpoint, the payload and that the requestor satisfies at least one of a security parameter or a compliance parameter of a first data resource (e.g., data resource 160) of the data lake environment. In some embodiments, satisfying the security parameter may include a validation of a credential in the payload based on a plurality user authentication level. For example, a centralized authentication system may verify the security parameter. In this example, satisfying security requirements may include validation of the provided credentials based on predefined security levels and user access histories. That is, a credential may be compared against a secure storage and a plurality of user authentication levels may be aligned with organizational security policies. In some embodiments, satisfying the security parameter may include a validation of the first type of access requested in the payload based on a plurality of access rules of the first data resource. For example, the access rules may be outlined in the organization's data governance framework (e.g., stored in the parameter and log dataset 122). In this example, satisfying policy compliance may include validation of access requests (e.g., first type of access) based on data in the payload fields.

In some embodiments, the processing circuits can identify at least one unsatisfied security or compliance parameter. The parameter and log dataset 122 of protection database 120 may include security parameters and compliance parameters. For example, the security parameters may include encryption standards, network security protocols, and data access limitations. In another example, the compliance parameters may include data retention policies, privacy standards, and industry compliance requirements. The processing circuits can transmit a failure message to a requestor computing system including the at least one security parameter or compliance parameter being unsatisfied. For example, the failure message may outline the deficiencies and recommend necessary actions to meet the requirements. In some embodiments, the processing circuits can receive a payload updated to satisfy the at least one security parameter or compliance parameter. For example, the payload updated may incorporate the necessary adjustments or additional information required to comply with the security and compliance parameters.

Generally, at block 530, the entry function can implement (or define) a criteria for determining an eligibility of the request for processing. That is, prior to execution a grant, revocation, or another action, the processing circuits can input into the entry function the request and payload to determine an eligibility of the request for processing. The entry function may receive as input data including user identity, requested resource, and associated security metrics. The input can then be used by the entry function to conduct an analysis and either invoke the access function or fail or deny the access request. At blocks 532 and 534, the processing circuits may record the request including the payload and a corresponding request identifier (e.g., ticket number) in the database system. In some embodiments, the processing circuits may generate a status of the request and log the status as "initiated." Additionally, at block 536, the processing circuits can verify the payload and transmit a confirmation response to a requestor computing system (e.g., user computing system 140 or workflow application system 150) indicating acceptance of the request. Furthermore, at block 530, the entry function can invoke the access function of block 540.

At block 540, the processing circuits may execute or perform an access function. Executing an access function may include updating at least one access setting or a permission of the first data resource (e.g., data resource 160). The access function may receive as input the validated request and payload data. The input can then be used by the access function to enforce the determined access controls and apply the appropriate permissions or restrictions. At block 542, the processing circuits may update, using an access function of the first endpoint, at least one access setting or a permission to the first data resource according to the request. That is, updating may include using the access function to modify an access level and apply a corresponding security policy to a user account of the requestor or the first data resource.

Generally, at block 540, the access function can implement (or define) an access restriction or an authentication restriction of the first data resource. That is, upon determining the eligibility of the request for processing, the access function can grant or revoke access (generally referred to as an access restriction) to a data resource or modify an authentication restriction (e.g., session management, secure data handling procedures, and user verification methods) of a data resource. For example, granting or revoking access to a data resource could include adjusting the user's permissions based on the compliance with the requested access level. In another example, modifying an authentication restriction to a data resource could include enhancing security measures such as updating password requirements or implementing two-factor authentication for sensitive operations.

At block 540, updating the access setting or permission may include (e.g., in response to the invocation by the entry function) modifying an access level by adjusting the at least one access setting or permission based on one or more database parameters for a plurality of user roles or resource types. In some embodiments, adjusting at least one access setting or permission for the first data resource may include granting or revoking access. For example, adjusting an access setting may include changing the scope of data the user can access, such as from viewing only to full editing rights. In another example, adjusting a permission may include authorizing the user to perform specific tasks within the data lake that were previously restricted. Additionally, an access setting may be a configuration parameter defining access controls to the first data resource. For example, a configuration parameter defining access controls may be a set of rules that govern who can access what data under certain conditions. Furthermore, a permission may be an access grant defining operations executable on the first data resource granted to the requestor. For example, operations executable on the first data resource may be read, write, update, and delete permissions (e.g., unique to each user account).

Additionally, at block 540, updating the access setting or permission may include applying the corresponding security policy to the user account or the first data resource by adjusting or enforcing the access restriction or the authentication restriction based on the first type of access requested. For example, applying the corresponding security policy to the user account may include implementing stricter access controls based on the sensitivity of the data accessed. In another example, adjusting or enforcing the access restriction based on the first type of access requested may include temporarily increasing monitoring on the users activities within the data environment to ensure compliance. In yet another example, adjusting or enforcing the authentication restriction based on the first type of access requested may include requiring additional credentials for accessing confidential data.

Additionally, at block 540, updating the access setting or permission may include generating a log report including information of the adjustment to (or enforcement of) the at least one access setting or permission, an identity of the requestor, and a timestamp of the execution of the access function. The log report may then be stored in the database system. For example, generating the log report may include documenting each step of the access modification process, including action performed and the final outcomes. In this example, the log report may store detailed records of all actions taken, providing a clear audit trail for future reference.

In some embodiments, the entry functions and access functions executed by the processing circuits may be serverless functions corresponding to an execution of a set of actions within a first workflow of the access provisioning. For example, the serverless functions may operate without the need for persistent server management, allowing for dynamic scaling and improved resource utilization in the execution of tasks. Furthermore, a workflow may be a process for handling access requests according to one or more security standards without user intervention or review. For example, the first workflow may be used to improve an access provisioning process, reducing delays and enhancing user satisfaction by quickly responding to access needs. In some embodiments, each of the serverless functions may be structured to execute a subset of actions of the set of actions within the first workflow of the access provisioning. For example, a first serverless function may be the entry function structured to execute initial validation and request logging (e.g., a first subset of actions). In another example, a second serverless function may be the access function structured to execute access configuration and enforcement (e.g., a second subset of actions).

In some embodiments, the processing circuits may activate the entry function and the access function on the first endpoint. That is, activating the entry function and the access function may include interfacing with the first data resource to apply the payload in enforcing the at least one security parameter or compliance parameter and processing the request for access. For example, applying the payload in enforcing the at least one security parameter or compliance parameter may include analyzing the data within the payload to confirm it satisfies all security and compliance standards before granting access. In another example, processing the request for access may include updating the access controls and documenting the changes in the system logs.

At block 550, the processing circuits may update the status of the request in the database system (e.g., protection database 120, specifically in parameter and log dataset 122). For example, the processing circuits may record the final output of the access provisioning process, including any approvals or denials, in a centralized database for future reference. Additionally, in response to updating the status of the request, the processing circuits may transmit a response to the request for access to a requestor computing system including an indication of a successful processing of the request. For example, the response may be a message outlining the actions taken, the status of the request, and any follow-up actions required from the requestor.

Example Computing System

Figure 6:
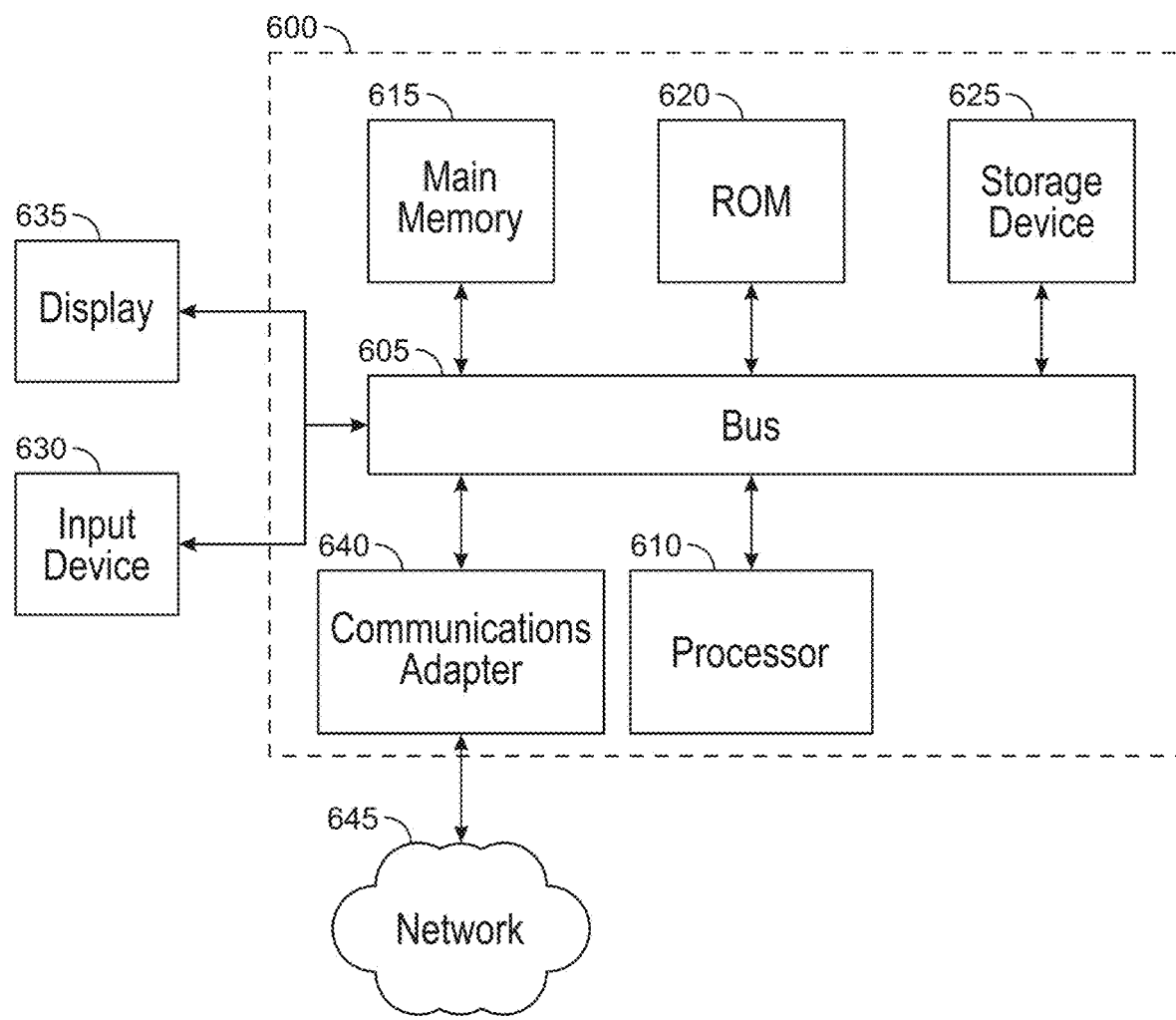
FIG. 6 is a block diagram illustrating an example computing system suitable for use in the various embodiments described herein.

Referring now to FIG. 6, a depiction of a computer system 600 is shown. The computer system 600 that can be used, for example, to implement a computing environment (e.g., provisioning system 100), the data processing system 110, the user computing systems 140, the workflow application system 150, and/or various other example systems described in the present disclosure. The computing system 600 includes a bus 605 or other communication component for communicating information and a processor 610 coupled to the bus 605 for processing information. The computing system 600 also includes main memory 615, such as a random-access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read-only memory (ROM) 620 or other static storage device coupled to the bus 605 for storing static information and instructions for the processor 610. A storage device 625, such as a solid-state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include any type of biometric sensor, a cursor control, such as a mouse, a trackball, or cursor direction keys, for communicating direction information and command selections to the processor 610 and for controlling cursor movement on the display 635.

In some implementation, the computing system 600 may include a communications adapter 640, such as a networking adapter. Communications adapter 640 may be coupled to bus 605 and may be configured to facilitate communications with a computing or communications network 645 (similar features and functionality as network 130 of FIG. 1) and/or other computing systems. In various illustrative implementations, any type of networking configuration may be achieved using communications adapter 640, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 600 in response to the processor 610 executing an implementation of instructions contained in main memory 615. Such instructions can be read into main memory 615 from another computer-readable medium, such as the storage device 625. Execution of the implementation of instructions contained in main memory 615 causes the computing system 600 to perform the illustrative processes described herein. One or more processors in a multi-processing implementation may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

That is, although an example processing system has been described in FIG. 6, implementations of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 6 as singular, stand-alone devices, one of ordinary skill in the art will appreciate that, in some implementations, the computing system 600 may include virtualized systems and/or system resources. For example, in some implementations, the computing system 600 may be a virtual switch, virtual router, virtual host, virtual server. In various implementations, computing system 600 may share physical storage, hardware, and other resources with other virtual machines. In some implementations, virtual resources of the network may include cloud computing resources such that a virtual resource may rely on distributed processing across more than one physical processor, distributed memory, etc.

Examples Interfaces

Figure 7A:
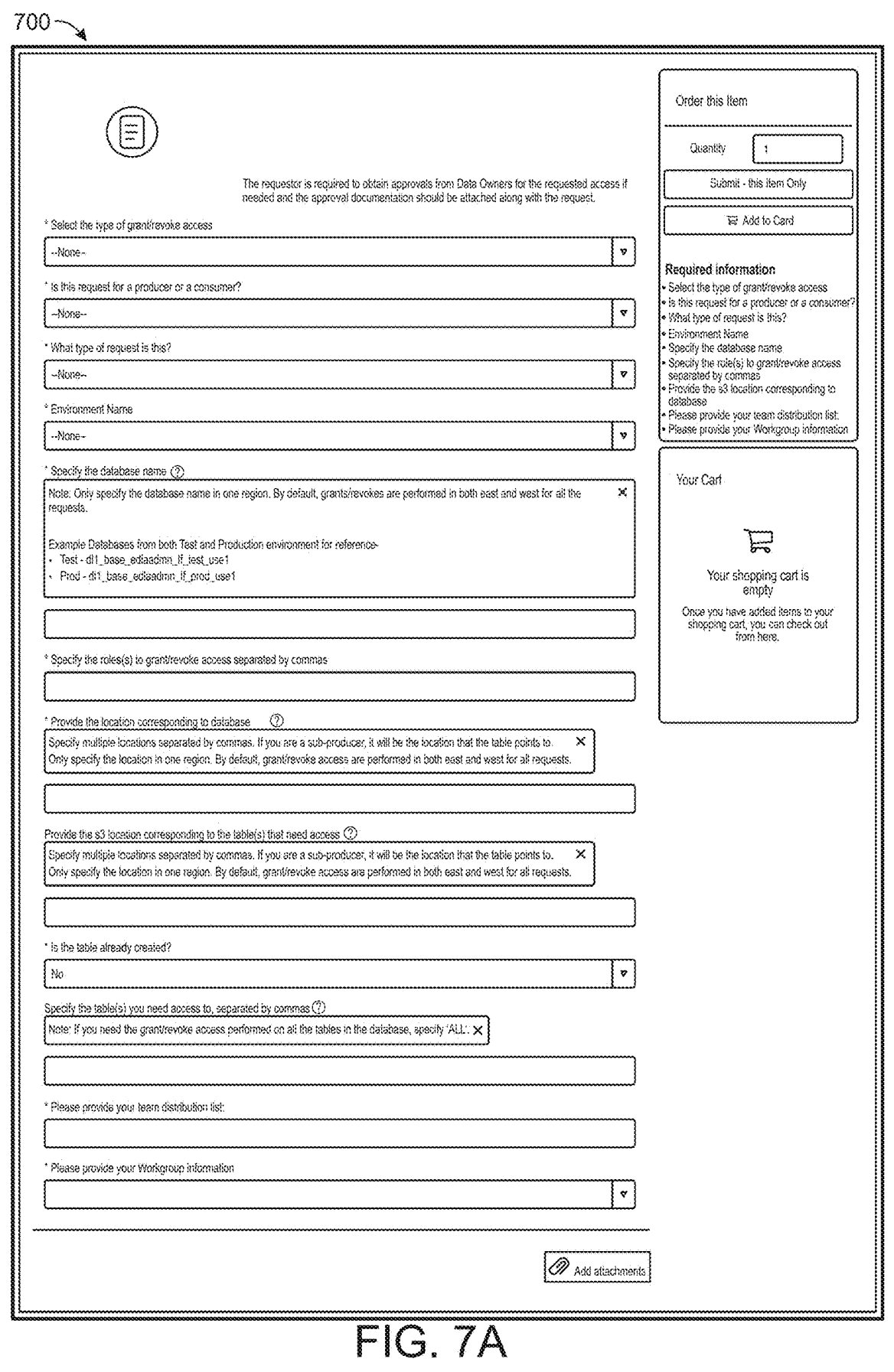

Referring now to FIG. 7A, depicting an access request interface 700, according to some embodiments. In some implementations, the access request interface 700 may be presented on the user computing system 140. As shown, in submitting a request for provisioning access, the user can interact with the plurality of interactable elements of the access request interface 700. For example, the user may select the type of access being requested (e.g., grant, revocation, etc.) and identify who is requesting the access (e.g., producer, consumer, etc.). In this example, the user may also identify the type of request, the environment name, the database name, the specific role(s) to grant or revoke access. Additionally, the user may provide the location corresponding to the database, provide an s3 location corresponding to the table for access, indicate if the table is already created, specify the table needed access to, provide a team distribution list, and/or provide workgroup information. In some implementations, the access request interface 700 may include additional or fewer interactable elements. As shown, the user can "Submit—this item only" or "Add to cart". The access request interface 700 may present content related to the access request in a shopping cart. In some implementations, the user can add attachments to the request.

Figure 7B:

Referring now to FIG. 7B, depicting an access request interface 750, according to some embodiments. FIG. 7B can include similar features as described above with reference to FIG. 7A. Additionally, the access request interface 750 may include a plurality of actionable elements related to requesting or revoking access to a table. For example, the user may identify if the request is for themselves or someone else and provide a content. In this example, the user may also provide the environment name, indicate if the user understands how changes will affect data of the table or database, and provide the database name. Additionally, the user can provide the table name, indicate if the table will be recreated with the same name, provide the team distribution list, provide the workgroup information, provide a short description of the subject, and a detailed description. As shown, the user can "Submit—this item only" or "Add to cart". The access request interface 750 may present content related to the access request in a shopping cart. In some implementations, the user can add attachments to the request.

Configuration of Example Embodiments

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In some embodiments, a computer program is provided, and the program is embodied on a computer readable medium. In some embodiments, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions, and arrangement of the example embodiments without departing from the scope of the present disclosure.

As used herein, an element or step recited in the singular and proceeded with the word "a" or "an" should be understood as not excluding plural elements or steps, unless such exclusion is explicitly recited. Furthermore, references to "exemplary embodiment," "one embodiment," or "some embodiment" of the present disclosure are not intended to be interpreted as excluding the existence of additional embodiments that also incorporate the recited features.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The patent claims at the end of this document are not intended to be construed under 35 U.S.C. § 112 (f) unless traditional means-plus-function language is expressly recited, such as "means for" or "step for" language being expressly recited in the claim(s).

Although the Figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The term "coupled" and variations thereof, as used herein, means the joining of two members directly or indirectly to one another. Such joining may be stationary (e.g., permanent, or fixed) or moveable (e.g., removable, or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular industrial environment or portion of an industrial environment. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method for access provisioning in a data lake environment, comprising:
   receiving, by one or more processing circuits via a gateway, a request for access by a requestor comprising a payload;
   initiating, by the one or more processing circuits, an endpoint command by invoking a first endpoint of a plurality of endpoints based on a first type of access requested in the request;
   generating, by the one or more processing circuits using an entry function of the first endpoint, a status of the request;
   logging, by the one or more processing circuits using the entry function of the first endpoint, the status of the request in a database system;
   verifying, by the one or more processing circuits using the entry function of the first endpoint, the payload and that the requestor satisfies at least one of a security parameter or a compliance parameter of a first data resource of the data lake environment;
   updating, by the one or more processing circuits using an access function of the first endpoint, at least one of an access setting or a permission to the first data resource according to the request, wherein updating comprises using the access function to modify an access level and apply a corresponding security policy to a user account of the requestor or the first data resource; and
   updating, by the one or more processing circuits, the status of the request in the database system.

2. The method of claim 1, wherein the entry function and the access function are executed based on:
   activating, by the one or more processing circuits, the entry function and the access function on the first endpoint; and
   wherein activating the entry function and the access function comprises interfacing with the first data resource to apply the payload in enforcing the at least one security parameter or compliance parameter and processing the request for access.

3. The method of claim 1, wherein the entry function comprises defining a criteria determining an eligibility of the request for processing, the method further comprising executing, by the one or more processing circuits, the entry function by:
   recording the request comprising the payload and a corresponding request identifier in the database system;
   logging the status as initiated;
   verifying the payload;
   transmitting a confirmation response to a requestor computing system indicating acceptance of the request; and
   invoking the access function.

4. The method of claim 3, wherein the access function comprises defining an access restriction or an authentication restriction of the first data resource, the method further comprising executing, by the one or more processing circuits, the access function by:
  in response to the invocation by the entry function, modifying the access level by adjusting the at least one access setting or permission based on one or more database parameters for a plurality of user roles or resource types;
  applying the corresponding security policy to the user account or the first data resource by adjusting or enforcing the access restriction or the authentication restriction based on the first type of access requested;
  generating a log report comprising information of the adjustment to the at least one of access setting or permission, an identity of the requestor, and a timestamp of the execution of the access function; and
  storing the log report in the database system.

5. The method of claim 4, wherein the adjustment of the at least one access setting or permission to the first data resource comprises granting access or revoking access, and wherein satisfying the security parameter corresponds to a validation of a credential in the payload based on a plurality user authentication levels, and wherein satisfying the compliance parameter corresponds to a validation of the first type of access requested in the payload based on a plurality of access rules of the first data resource.

6. The method of claim 1, wherein the plurality of endpoints comprise a name-based endpoint, a data filter endpoint, a drop table endpoint, and a tag based endpoint, and wherein the initiating to the first endpoint is further based on access parameters in a plurality of payload fields of the payload.

7. The method of claim 1, wherein the one or more processing circuits is a distributed computing system comprising at least a first computing system executing at least one of the one or more processing circuits and a second computing system executing at least one of the one or more processing circuits, and wherein the method further comprising:
  in response to receiving the request, routing, by the one or more processing circuits, the request and the payload to the first computing system or the second computing system based on a real-time status of either the first computing system or the second computing system.

8. The method of claim 1, wherein the access setting corresponds to a configuration parameter defining access controls to the first data resource, and wherein the permission corresponds to an access grant defining operations executable on the first data resource granted to the requestor.

9. The method of claim 1, prior to verifying the payload, the method further comprising:
  identifying, by the one or more processing circuits, the at least one security parameter or compliance parameter is unsatisfied;
  transmitting, by the one or more processing circuits, a failure message to a requestor computing system comprising the at least one security parameter or compliance parameter being unsatisfied; and
  receiving, by the one or more processing circuits, a payload updated to satisfy the at least one security parameter or compliance parameter.

10. The method of claim 1, further comprising:
  in response to updating the status of the request, transmitting, by the one or more processing circuits, a response to the request for access to a requestor computing system, the response comprising an indication of a successful processing of the request.

11. The method of claim 1, wherein the entry function and the access function are serverless functions corresponding to an execution of a set of actions within a first workflow of the access provisioning, wherein each of the serverless functions are structured to execute a subset of actions of the set of actions within the first workflow of the access provisioning.

12. A data processing system for access provisioning in a data lake environment, the data processing system comprising:
  one or more memory devices having instructions stored thereon that, when executed by one or more processors, cause the one or more processors to perform operations comprising:
    receiving, via a gateway, a request for access by a requestor comprising a payload;
    initiating an endpoint command by invoking a first endpoint of a plurality of endpoints based on a first type of access requested in the request;
    generating, using an entry function of the first endpoint, a status of the request;
    logging, using the entry function of the first endpoint, the status of the request in a database system;
    verifying, using the entry function of the first endpoint, the payload and that the requestor satisfies at least one of a security parameter or a compliance parameter of a first data resource of the data lake environment;
    updating, using an access function of the first endpoint, at least one of an access setting or a permission to the first data resource according to the request, wherein updating comprises using the access function to modify an access level and apply a corresponding security policy to a user account of the requestor or the first data resource; and
    updating the status of the request in the database system.

13. The data processing system of claim 12, wherein the entry function and the access function are executed based on the operations further comprising:
  activating the entry function and the access function on the first endpoint; and
  wherein activating the entry function and the access function comprises interfacing with the first data resource to apply the payload in enforcing the at least one security parameter or compliance parameter and processing the request for access.

14. The data processing system of claim 12, wherein the entry function comprises defining a criteria determining an eligibility of the request for processing, the operations further comprising executing the entry function by:
  recording the request comprising the payload and a corresponding request identifier in the database system;
  logging the status as initiated;
  verifying the payload;
  transmitting a confirmation response to a requestor computing system indicating acceptance of the request; and
  invoking the access function.

15. The data processing system of claim 14, wherein the access function comprises defining an access restriction or an authentication restriction of the first data resource, the operations further comprising executing the access function by:
  in response to the invocation by the entry function, modifying the access level by adjusting the at least one access setting or permission based on one or more database parameters for a plurality of user roles or resource types;

applying the corresponding security policy to the user account or the first data resource by adjusting or enforcing the access restriction or the authentication restriction based on the first type of access requested;

generating a log report comprising information of the adjustment to the at least one of access setting or permission, an identity of the requestor, and a timestamp of the execution of the access function; and storing the log report in the database system.

16. The data processing system of claim 15, wherein the adjustment of the at least one access setting or permission to the first data resource comprises granting access or revoking access, and wherein satisfying the security parameter corresponds to a validation of a credential in the payload based on a plurality user authentication levels, and wherein satisfying the compliance parameter corresponds to a validation of the first type of access requested in the payload based on a plurality of access rules of the first data resource.

17. The data processing system of claim 12, wherein the plurality of endpoints comprise a name-based endpoint, a data filter endpoint, a drop table endpoint, and a tag based endpoint, and wherein the initiating to the first endpoint is further based on access parameters in a plurality of payload fields of the payload.

18. The data processing system of claim 12, wherein the access setting corresponds to a configuration parameter defining access controls to the first data resource, and wherein the permission corresponds to an access grant defining operations executable on the first data resource granted to the requestor.

19. A non-transitory computer readable medium comprising instructions stored thereon that, when executed by one or more processors, cause the one or more processors to perform operations comprising:

receiving, via an application programming interface gateway, a request for access by a requestor comprising a payload;

initiating an endpoint command by invoking a first endpoint of a plurality of endpoints based on a first type of access requested in the request;

generating, using an entry function of the first endpoint, a status of the request;

logging, using the entry function of the first endpoint, the status of the request in a database system;

verifying, using the entry function of the first endpoint, the payload and that the requestor satisfies at least one of a security parameter or a compliance parameter of a first data resource of the data lake environment;

updating, using an access function of the first endpoint, at least one of an access setting or a permission to the first data resource according to the request, wherein updating comprises using the access function to modify an access level and apply a corresponding security policy to a user account of the requestor or the first data resource; and updating the status of the request in the database system.

20. The non-transitory computer-readable medium of claim 19, wherein the operations further comprise:

activating the entry function and the access function on the first endpoint; and wherein activating the entry function and the access function comprises interfacing with the first data resource to apply the payload in enforcing the at least one security parameter or compliance parameter and processing the request for access.

\* \* \* \* \*